United States Patent [19]
Hebert et al.

[11] Patent Number: 6,088,749
[45] Date of Patent: Jul. 11, 2000

[54] UNIVERSAL API WITH GENERIC CALL PROCESSING MESSAGE HAVING USER-DEFINED PPL EVENT ID AND GENERIC RESPONSE MESSAGE FOR COMMUNICATIONS BETWEEN TELECOMMUNICATIONS SWITCH AND HOST APPLICATION

[75] Inventors: Mark P. Hebert, Kingston; Michael C. Silva, Centerville, both of Mass.

[73] Assignee: Excel Switching Corp., Hyannis, Mass.

[21] Appl. No.: 09/348,965

[22] Filed: Jul. 7, 1999

Related U.S. Application Data

[60] Continuation-in-part of application No. 09/168,130, Oct. 7, 1998, which is a division of application No. 08/566,414, Nov. 30, 1995, Pat. No. 5,826,030.

[51] Int. Cl.[7] .......................... G06F 13/00; G06F 13/38; G06F 15/163; G06F 3/00; H04J 3/16
[52] U.S. Cl. .......................... 710/105; 710/15; 710/19; 710/62; 710/63; 370/469; 709/230; 709/300; 709/302
[58] Field of Search .................................. 709/300, 302, 709/230; 710/105, 129, 131, 62, 63, 15, 19; 370/469; 395/680, 682, 200.61, 285, 309, 311, 882, 883, 835, 839, 200.6

[56] References Cited

U.S. PATENT DOCUMENTS

| | | | |
|---|---|---|---|
| 4,527,012 | 7/1985 | Caplan et al. | 179/18 |
| 4,768,150 | 8/1988 | Chang et al. | 364/300 |
| 5,142,528 | 8/1992 | Kobayashi et al. | 370/79 |
| 5,414,833 | 5/1995 | Hershey et al. | 395/575 |
| 5,426,694 | 6/1995 | Hebert | 379/242 |
| 5,509,121 | 4/1996 | Nakata et al. | 395/200.1 |
| 5,559,802 | 9/1996 | Robinson et al. | 370/94.1 |
| 5,598,409 | 1/1997 | Madonna et al. | 370/364 |
| 5,619,499 | 4/1997 | Nakabayashi | 370/469 |
| 5,931,914 | 8/1999 | Chiu | 709/230 |
| 5,991,302 | 11/1999 | Berl et al. | 370/400 |
| 6,014,380 | 1/2000 | Hendel et al. | 370/392 |
| 6,018,766 | 1/2000 | Samuel et al. | 709/218 |

*Primary Examiner*—Thomas C. Lee
*Assistant Examiner*—Tanh Quang Nguyen
*Attorney, Agent, or Firm*—Cesari and McKenna, LLP

[57] ABSTRACT

The present invention is a standardized host-to-switch application program interface (API) for performing call control processing, capable of being customized to meet telecommunications application and network signalling protocol requirements. The universal API comprises one or more generic messages having programmable fields for transmitting commands, status, and data between the host application and the switch. The present invention further comprises a programmable telecommunication switch that provides a user with the ability to define a desired API protocol, either "standard" or custom in nature, for performing any desired switching functions. The present invention includes a protocol development environment which enables a user to define a separate finite state machine for each port provided by the switch. Each finite state machine may be independently defined by combining a series of elementary processing steps, called atomic functions, into primitives, which are in turn combined with states and events to define the desired state machine. Such state machines may include atomic functions configured to generate predetermined messages under predetermined conditions and containing predetermined information. Such state machines may further include the ability to respond to state events that include the receipt of generic API messages configured to provide the state machine with information from the host application.

6 Claims, 24 Drawing Sheets

FIG. 3A

APPLICATION LAYER (LAYER 5)
- MATRIX/LINE CARD MANAGEMENT
  - DOWNLOAD CONTROL
  - ALARM PROCESSING
  - REDUNDANT MATRIX CONTROL
- CONFIGURATION MANAGEMENT
  - MATRIX CONFIGURATION
  - LINE CARD CONFIGURATION
- HIGH LEVEL (LAYER 5) CALL PROCESSING
  - INTERACTIVE DIGIT COLLECTION
  - RECORDED ANNOUNCEMENT CONTROL FOR INTERACTIVE VOICE
    RESPONSE APPLICATION SUPPORT
  - BROADCASTING/CONFERENCING CONTROL
  - INBOUND CALL ROUTING/QUEUEING
  - OUTBOUND CALL INITIATION WITH DIGIT OUTPULSING
  - ADDRESS DIGIT ROUTING TO CHANNELS/CHANNEL GROUPS
  - CALL HUNTING FOR OUTBOUND CHANNEL SELECTION
  - CALL PROGRESS TONE CONTROL FOR INBOUND/
    OUTBOUND CALLS
  - MULITPLE CALL MGMT FEATURES (TRANSFER, HOLD, CON-
    FERENCING, CALLBACK, FORWARDING, ETC.)
  - CALL DETAIL RECORDING

CALL MANAGEMENT LAYER (LAYER 4)
- INTERACTIVE RECORDED ANNOUNCEMENT CONTROL (USER
  DIGIT DRIVEN)
- LAYER 4/APPLICATION LAYER (LAYER 5) INITIATED CALL PARK
- 1-WAY/2-WAY/CONFERENCE CONNECTION MANAGEMENT
- RECONNECTION (TRANSFER)
- LAYER 4 OUTGOING OUTSEIZE INITIATION FOR 2-WAY CONNECTIONS
- MULTIPLE CALL MGMT FEATURES (TRANSFER, HOLD, CONFERENCING,
  CALLBACK, FORWARDING, ETC.)
- CUSTOMIZATION OF INSEIZE COMPLETION REPORT SENT TO THE
  APPLICATION LAYER (LAYER 5)

NETWORK PROTOCOL LAYER (LAYER 3)
- IN BAND LINE/ADDRESS SIGNALLING CONTROL
  - E&M INTERFACE
  - LOOPSTART, GROUNDSTART TRUNK INTERFACES
  - LOOPSTART, GROUNDSTART LINE INTERFACES
  - MULTI-WINK MFR1 FEATURE GROUP D
  - DTMF DIALED NUMBER INDENTIFICATION SERVICES (DNIS)
  - COMPELLED R2 FOR INTERNATIONAL E1 INTERFACES
  - IN BAND/EXTENDED IN BAND/MULTI-WINK COIN SIGNALLING
  - CUSTOM T1/E1 SERVICE CARD INTERFACES
- OUT OF BAND SIGNALLING CONTROL
  - ISDN PRIMARY RATE LAYER 3 Q.931
  - SS7 ISDN USER PART (ISUP)

FIG. 3B

LINK LAYER (LAYER 2)
- T1 ROBBED BIT SIGNALLING SCANNING
- E1 CHANNEL ASSOCIATED SIGNALLING SCANNING
- T1/E1 LINE INTERFACE FRAME ALARM CONTROL
- DSP TONE RECEPTION CONTROL
  - IN BAND ADDRESS SIGNALLING (MFR1, MFR2, DTMF)
  - CALL PROGRESS ANALYSIS
- DSP TONE GENERATION CONTROL
  - IN BAND ADDRESS SIGNALLING (MFR1, MFR2, DTMF)
  - CALL PROGRESS TONE GENERATION
  - CUSTOM CALL PROGRESS TONE GENERATION
- SS7 MTP2/MTP3
- DSP RECORDED VOICE ANNOUNCEMENT CONTROL
- DSP CONFERENCE GENERATION CONTROL
- GENERIC DSP FUNCTION CONTROL
  - DSP PROCESSOR TO MFDSP MAIN PROCESSOR DSP CONTROL/ INFORMATIONAL MESSAGES
  - MFDSP MAIN PROCESSOR TO DSP PROCESSOR CONTROL/ INFORMATIONAL MESSAGES
  - MFDSP MAIN PROCESSOR DSP FUNCTION ANALYSIS/CONTROL
- LAPD Q.921

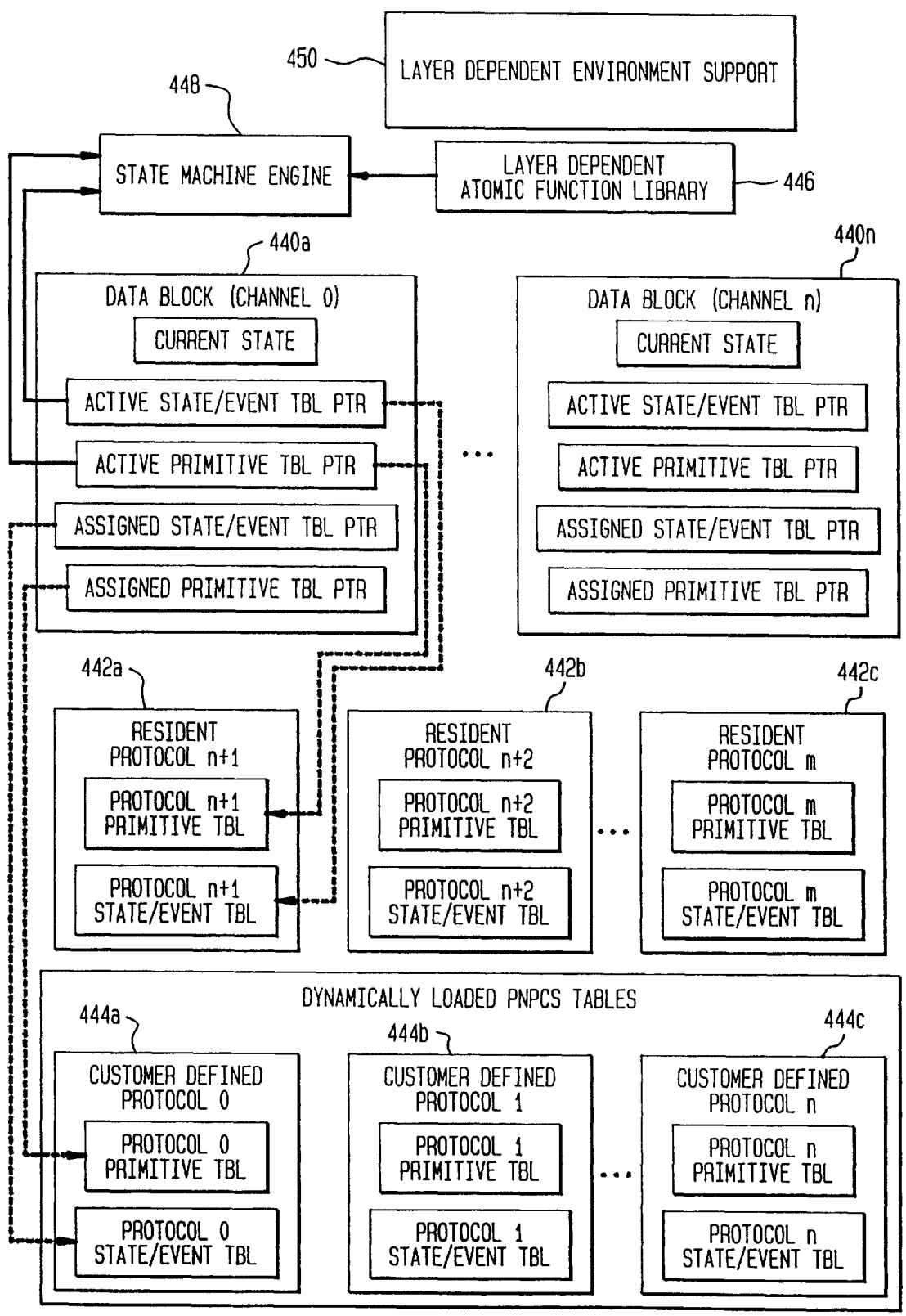

FIG. 7F

| PRIMITIVE ID | 1ST ATOMIC FUNCTION | 2ND ATOMIC FUNCTION | 3RD ATOMIC FUNCTION | 4TH ATOMIC FUNCTION | 5TH ATOMIC FUNCTION |
|---|---|---|---|---|---|
| PRIMITIVE #1 | af035 (0x01, 0x00) | | | | |
| PRIMITIVE #2 | af060 (0x16, 0x00) | af062 (0x00, 0x00) | af140 (0x00, 0x00) | af212 (0x01, 0x00) | af050 (0x01, 0x10) |
| PRIMITIVE #3 | af035 (0x04, 0x00) | | | | |
| PRIMITIVE #4 | af047 (0x01, 0x00) | af053 (0x01, 0x00) | af036 (0x02, 0x01) | af147 (0x00, 0x00) | |
| PRIMITIVE #5 | af060 (0x16, 0x00) | af140 (0x00, 0x00) | af212 (0x03, 0x00) | af050 (0x01, 0x10) | |
| PRIMITIVE #6 | af060 (0x16, 0x00) | | | | |
| PRIMITIVE #7 | af060 (0x16, 0x00) | | | | |
| PRIMITIVE #8 | af035 (0x04, 0x00) | | | | |
| PRIMITIVE #9 | af047 (0x01, 0x00) | af053 (0x01, 0x00) | af036 (0x03, 0x0) | | |

| STATE NO. | EVENT | EVENT ID | PRIMITIVE ID | NEXT STATE | STATE TYPE |
|---|---|---|---|---|---|
| STATE 0 | L4PPLevL3_SETUP_INDICATION | ev050 | PRIMITIVE 1 | STATE 1 | NORMAL |
| STATE 1 | L4PPLevL5_EVENT_REQ_1 | ev501 | PRIMITIVE 2 | STATE 2 | NORMAL |
| STATE 2 | PPLevTIMER1<br>L4PPLevDSP_RESULT_DIGITS | ev191<br>ev066 | PRIMITIVE 3<br>PRIMITIVE 4 | STATE ?<br>STATE 3 | UNKNOWN<br>NORMAL |
| STATE 3 | L4PPLevL5_EVENT_REQ_4<br>L4PPLevL5_EVENT_REQ_5<br>L4PPLevL5_EVENT_REQ_6 | ev504<br>ev505<br>ev506 | PRIMITIVE 5<br>PRIMITIVE 6<br>PRIMITIVE 7 | STATE 4<br>STATE ?<br>STATE ? | NORMAL<br>UNKNOWN<br>UNKNOWN |
| STATE 4 | PPLevTIMER1<br>L4PPLevDSP_RESULT_DIGITS | ev191<br>ev066 | PRIMITIVE 8<br>PRIMITIVE 9 | STATE ?<br>STATE ? | UNKNOWN<br>UNKNOWN |

| PRIMITIVE ID | 1ST ATOMIC FUNCTION | 2ND ATOMIC FUNCTION | 3RD ATOMIC FUNCTION | 4TH ATOMIC FUNCTION | 5TH ATOMIC FUNCTION |
|---|---|---|---|---|---|
| PRIMITIVE #1 | af035 (0x01, 0x00) | | | | |
| PRIMITIVE #2 | af060 (0x16, 0x00) | af062 (0x00, 0x00) | af140 (0x00, 0x00) | af212 (0x01, 0x00) | af050 (0x01, 0x10) |
| PRIMITIVE #3 | af025 (0x02, 0x01) | | | | |
| PRIMITIVE #4 | af047 (0x01, 0x00) | af053 (0x01, 0x00) | af147 (0x60, 0x00) | af026 (0x01, 0x00) | |
| PRIMITIVE #5 | af140 (0x00, 0x00) | af212 (0x03, 0x00) | af050 (0x01, 0x10) | | |
| PRIMITIVE #6 | af035 (0x04, 0x00) | | | | |
| PRIMITIVE #7 | af147 (0x01, 0x00) | af053 (0x01, 0x00) | af028 (0x01, 0x00) | | |

| STATE NO. | EVENT | EVENT ID | PRIMITIVE ID | NEXT STATE | STATE TYPE |
|---|---|---|---|---|---|
| STATE 0 | L4PPLevL3_SETUP_INDICATION | ev050 | PRIMITIVE 1 | STATE 1 | NORMAL |
| STATE 1 | L4PPLevL5_EVENT_REQ_1 | ev501 | PRIMITIVE 2 | STATE 2 | NORMAL |
| STATE 2 | PPLevTIMER1<br>L4PPLevDSP_RESULT_DIGITS | ev191<br>ev066 | PRIMITIVE 3<br>PRIMITIVE 4 | STATE ?<br>STATE 3 | UNKNOWN<br>INTERNAL |
| STATE 3 | PPLevINT_EVENT_0<br>PPLevINT_EVENT_1<br>PPLevINT_EVENT_2 | ev200<br>ev201<br>ev202 | PRIMITIVE 5<br>PRIMITIVE ?<br>PRIMITIVE ? | STATE 4<br>STATE ?<br>STATE ? | NORMAL<br>UNKNOWN<br>UNKNOWN |
| STATE 4 | PPLevTIMER1<br>L4PPLevDSP_RESULT_DIGITS | ev191<br>ev066 | PRIMITIVE 6<br>PRIMITIVE 7 | STATE ?<br>STATE ? | UNKNOWN<br>UNKNOWN |

890

UNIVERSAL API WITH GENERIC CALL PROCESSING MESSAGE HAVING USER-DEFINED PPL EVENT ID AND GENERIC RESPONSE MESSAGE FOR COMMUNICATIONS BETWEEN TELECOMMUNICATIONS SWITCH AND HOST APPLICATION

CROSS REFERENCE TO RELATED APPLICATION

This application is a continuation-in-part of U.S. patent application Ser. No. 09/168,130, filed on Oct. 7, 1998, entitled TELECOMMUNICATION SWITCH HAVING A UNIVERSAL API WITH A SINGLE CALL PROCESSING MESSAGE INCLUDING USER-DEFINABLE DATA AND RESPONSE MESSAGE EACH HAVING A GENERIC FORMAT, which application is a divisional application of U.S. patent application Ser. No. 08/566,414, filed on Nov. 30, 1995 (Now U.S. Pat. No. 5,826,030).

1. Field of the Invention

The present invention relates generally to the field of telecommunications and, more specifically, to a universal applications program interface (API) for standardized interactive call control processing with a programmable telecommunication switch and a host computer supporting various telecommunications applications.

BACKGROUND OF THE INVENTION

2. Description of the Related Art

Programmable telecommunication switches are used in a wide variety of applications such as voice messaging, telemarketing services and the like. A programmable switch is usually controlled by a host device, which is typically a computer that runs a telecommunications application program. A customer may either purchase a commercially available application program that is compatible with the host and switch hardware or may elect to write a custom program.

In most applications, a programmable switch is connected to a public telephone network by one or more analog trunks or digital spans (e.g., a T1 span) which are terminated at the switch. The switch may also terminate one or more "lines" which are connected to devices such as telephone sets. Communication over any given trunk, span or line is carried out in accordance with an assigned signalling protocol.

For various switching system applications, the sequence of switching events must be controlled and the switching functions must be performed in accordance with the requisite protocols. Throughout the world, there are numerous "standard" signalling protocols in use, including E&M wink start, loopstart, groundstart, international compelled R2 using MFR2 address signalling, and E1 Channel Associated Signalling (CAS) protocols using DTMF/MFR1 signalling. Typically, conventional programmable switches are configured such that a particular signalling protocol is associated with a particular trunk, span or line.

To control the telecommunications switch at the various levels necessary to satisfy specialized switching functions, conventional host applications have been configured to generate digital signal commands corresponding to a plurality of switching events. Correspondingly, conventional communications switches have been configured to generate digital signal responses related to the processing of these events at the ports. These messages are constant or "hard-coded" messages, each configured to communicate specific information between the host application and the switch. The interface between the telecommunications application and the switch through which these messages are transferred is referred to as an applications program interface, or API.

Each of the signalling protocols requires predetermined host-to-switch call control processing protocols to be established, each protocol including the exchange of one or more constant messages. Thus, to control the programmable switch to perform the requisite switching events necessary to maintain communications, communications switches must be capable of supporting extremely large number of these specific host-to-switch command messages and associated protocols. Accordingly, each signalling protocol has associated with it one or more different message sets stored and indexed at the host as well as at the switch. The message sets and resulting host-to-switch protocol are also dependent upon specific telecommunications applications requirements, such as the amount and type of information an application requires for it to appropriately control the switch to support a particular signalling protocol.

Furthermore, conventional programmable switches may be connected between the public telephone network and other devices such as a voice messaging system. Because such devices may perform specialized functions and are not intended to connect directly to the public telephone network, they do not typically adhere to standard signalling protocols. Thus, for a user to be able to control the programmable switch in such a fashion that proper communication is maintained both, with the public telephone network and with other devices connected to the switch, complex and varied signalling protocol requirements must be satisfied. Conventional communications switches implement numerous specific sets of API messages to support these varied requirements.

As a result of the implementation of constant messages and the various telecommunications applications and signalling protocol requirements, there has been no standardization of the interface between the host applications and the telecommunications switch. This has led to increased cost in developing the necessary hardware and software to support specific protocols to satisfy host applications requirements as well as signalling protocol requirements for each trunk, span, and line.

Furthermore, as a result of having separate and distinct API messages, each dedicated to a specific command or data transfer, the addition of features to the telecommunications switch necessitates the creation and implementation of one or more additional API messages to support the associated signalling protocol. To implement each new unique message, a costly and time-consuming software change to the switch and host must be made.

What is needed, therfore, is a universal API that provides standardized call control processing by utilizing one or more generic message formats and supporting host-to-switch call control processing that may be used regardless of the host application or signalling protocol requirements. Furthermore, the generic message formats must be sufficiently flexible and versatile to be customized to support present and future requirements of telecommuincations applications and signalling protocols now or later developed.

SUMMARY OF THE INVENTION

The present invention is a universal host-to-switch application program interface (API) utilizing a generic message format for performing call control processing and capable of being customized to meet telecommunications application and network signalling protocol requirements. The generic message formats have programmable fields for transmitting commands, status, and data between the host application and the switch. The present invention further comprises a programmable telecommunication switch that provides a user with the ability to define a desired signalling protocol, either "standard" or custom in nature, for performing any desired switching functions.

The present invention includes a protocol development environment which enables a user to define a separate finite state machine for each port provided by the switch. Each finite state machine may be independently defined by combining a series of elementary processing steps, called atomic functions, into primitives, which are in turn combined with states and events to define the desired state machine. Such state machines may include atomic functions configured to generate predetermined messages under predetermined conditions and containing predetermined information. Such state machines may further include the ability to respond to state events that include the receipt of generic API messages configured to provide the state machine with information from the host application.

In addition, the present invention may serve as a development tool for creating customized signalling protocols supporting telecommunications applications such as personal communications services (PCS), 800/900 service, voice mail, telemarketing, among others. The present invention may also be used to control or manage a wide variety of communications services within a programmable switch through the transfer of the generic API messages, including conferencing, voice recorded announcements, tone generation, tone reception, call progress analysis, voice recognition, voice compression and fax encoding/decoding.

The universal API of the present invention may be implemented to achieve communications internal to the switch as well. For example, the generic messages of the universal API may be used to support communications between any software layer within the switch.

Advantageously, the generic message structure of the present invention enables additional call processing features to be added to the telecommunications switch that the host can initiate without implementing additional content-specific signalling dedicated to that feature. This enables the creation of customized API message protocols that can grow beyond the limitations of specific messages for specific features and functions.

Another advantage of the generic message structure of the present invention is that it provides the commonality and flexibility necessary to be a generic interface for application development. This significantly reduces the complexity of the host/switch communications interface and eliminates the cost of supporting an interface composed of numerous specialized messages.

Another advantage of the present invention is that it provides the user with the ability to transmit and receive information to all software layers of the switch using standardized messages. Significantly, this eliminates the burden of having to store large numbers of distinct messages for managing dissimilar functions performed by the same or different software layers of the switch. Thus, the large message sets stored and indexed in conventional switches are eliminated by the present invention.

Another advantage of the present invention is the increased degree of interaction with the host that can be achieved simply by introducing at various processing points an atomic function that sends and receives data into numerous locations in the switch.

Another advantage of the present invention is that it enables a user to create multiple network signalling protocols by creating separate state machines to address each variation of a signalling protocol. The universal API may be programmed to achieve the necessary communications to support each of these protocol-specific state machines. Thus, the structure of the messages comprising the host-to-switch interface may remain unchanged despite the multiple signalling protocols supported by the switch.

Further features and advantages of the present invention as well as the structure and operation of various embodiments of the present invention are described in detail below with reference to the accompanying drawings. In the drawings, like reference numbers indicate identical or functionally similar elements. Additionally, the left-most one or two digits of a reference number identifies the drawing in which the reference number first appears.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 3A and 3B depict some of the specific features and functions associated with each of the software layers depicted in FIG. 2;

FIG. 4 is a block diagram of a finite state machine development environment constructed in accordance with a preferred embodiment of the present invention;

FIGS. 7F and 7G are tables showing the correspondence between the atomic functions, primitives and states of FIGS. 7A–7E;

FIGS. 8F and 8G are tables showing the correspondence between the atomic functions, primitives and states of FIGS. 8A–8E;

DETAILED DESCRIPTION OF THE INVENTION

Figure 1:
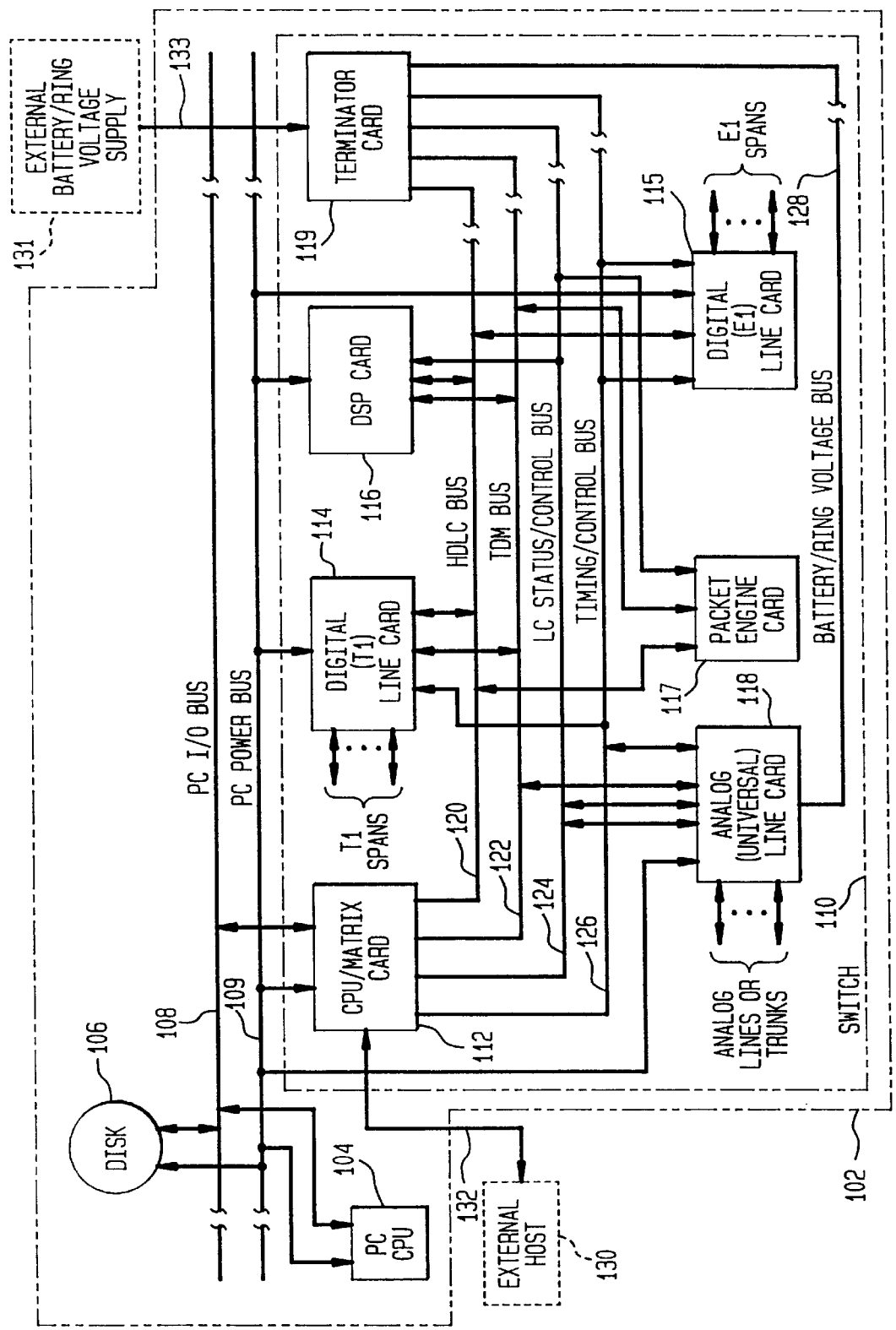
FIG. 1 is a block diagram of a programmable telecommunications switch which may be programmed by a user in accordance with a preferred embodiment of the present invention.

FIG. 1 shows a commercially available personal computer (PC) 102 which includes a PC central processing unit (CPU) 104 and a hard disk drive 106 interconnected by a PC input/output (I/O) bus 108 and a PC power bus 109. The PC 102 is preferably a PC-AT®, sold by International Business Machines (IBM), or a compatible thereof. Other personal computers having more memory or more powerful CPUs than the PC-AT® may also be used. The PC 102 preferably operates under an application-oriented operating system, such as DOS® or UNIX®.

The PC 102 consists of a chassis or housing in which a motherboard is mounted, along with the disk drive 106 and other optional assemblies such as floppy disk drives., modems and the like. The PC CPU 104 is mounted on the motherboard, which includes a series of edge connectors into which other boards (cards) may be inserted and thereby connected to the PC I/O and power busses 108 and 109.

A programmable telecommunication switch 110 resides within the PC 102. A CPU/matrix card 112 is inserted into one of the slots on the motherboard and thus connected to the busses 108 and 109. The CPU/matrix card 112 is interconnected with a digital (T1) line card 114, a digital (E1) line card 115, a digital signal processing (DSP) card 116, a packet engine card 117, an analog (universal) line card 118 and a terminator card 119 by four busses: a high level data link control (HDLC) or interprocessor bus 120; a time division multiplex (TDM) bus 122; a line card (LC) status/control bus 124; and a timing/control bus 126. A battery/ring voltage bus 128 supplies battery voltage (48VDC) and ringing voltage (109VAC) to the analog line card 118. The terminator card 119 serves to physically terminate busses 120, 122, 124, 126 and 128.

The line cards 114, 115 and 118 and the DSP card 116 are all connected to and receive their basic operating power from the PC power bus 109. Although only one digital (T1) line card 114, one digital (E1) line card 115 and one analog line card 118 are depicted, it should be understood that additional line cards of any type may be added subject to two physical limitations: (1) the maximum switching capacity of the CPU/matrix card 112, and (2) the physical space within the chassis of the PC 102.

An external host 130, which may comprise a separate personal computer, workstation or other computer, may optionally be connected via a communication channel 132 to the CPU/matrix card 112. The CPU/matrix card 112 preferably includes a conventional RS-232 compatible interface for connecting the channel 132. The external host 130 preferably operates under an application-oriented operating system.

If desired, the switch I 0 can reside on a passive backplane (no PC CPU 104 or disk 106 present) from which its receives electrical power and be controlled by the external host 130. For example, the present invention may be implemented in other processing platforms such as the expandable telecommunications switch disclosed in copending patent application, Ser. No. 08/207,931, titled Expandable Telecommunications System, assigned to the assignee of the present application and which is hereby incorporated by reference in its entirety.

An external battery/ring voltage supply 131 is connected via a path 133 to the terminator card 119. Supply 131 may comprise, for example, a commercially available power supply.

With the exception of the digital (E1) line card 115, the DSP card 116 and the packet engine card 117, details regarding the construction of the various cards shown in FIG. 1 are set forth in U.S. Pat. No. 5,321,744, titled Programmable Telecommunications Switch for Personal Computer, assigned to the assignee of the present application and which is hereby incorporated by reference in its entirety. Digital (E1) line card 115 is preferably constructed using similar hardware to that disclosed for T1 line card 114, except for differences in conventional circuitry which allow line card 115 to terminate E1 spans as opposed to T1 spans.

Details regarding the construction of the DSP card 116 and the packet engine card 117 are set forth in U.S. Pat. No. 5,349,579, titled Telecommunications Switch With Programmable Communications Services, assigned to the assignee of the present application and which is hereby incorporated by reference in its entirety.

Figure 2:
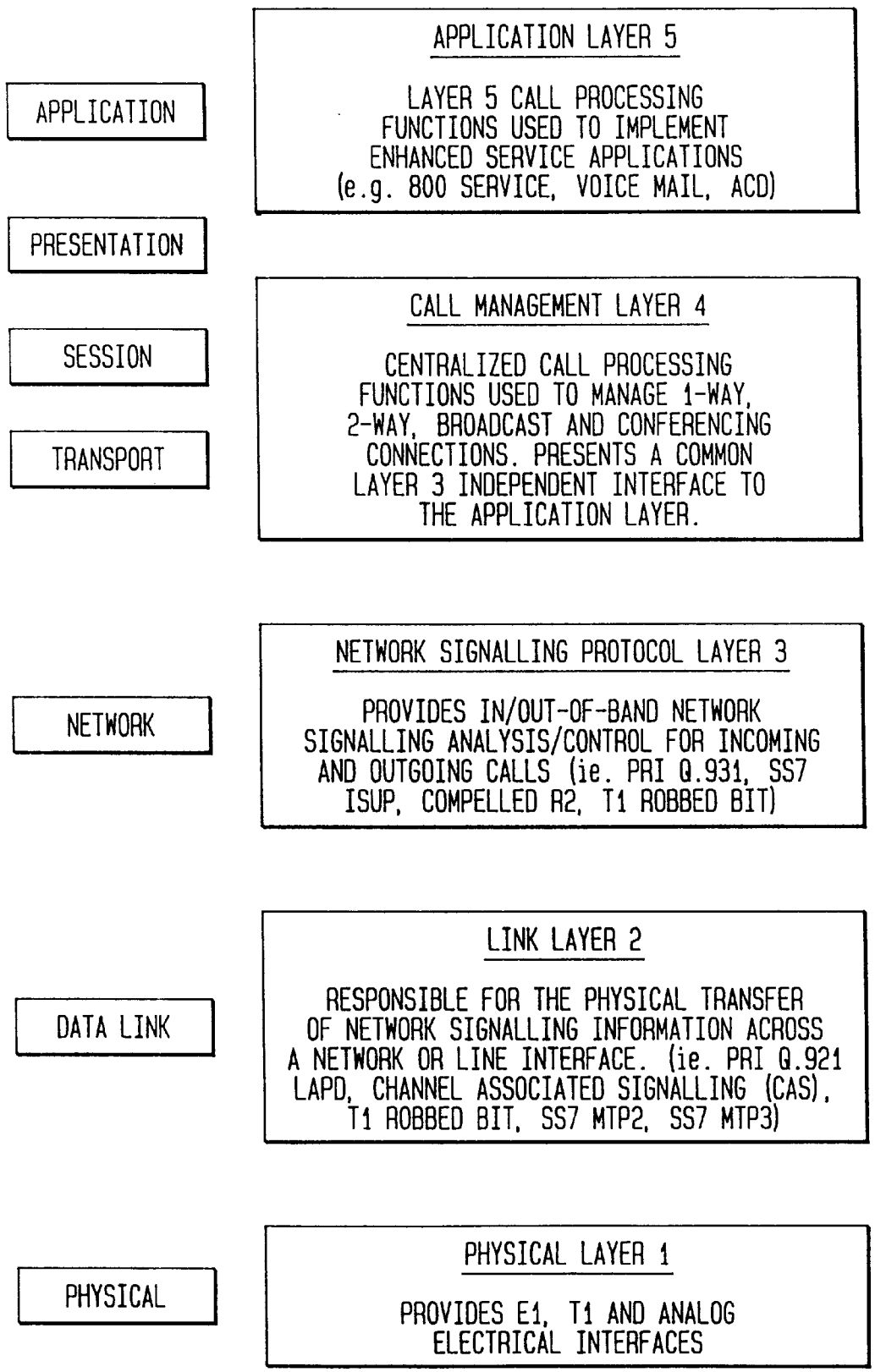
FIG. 2 is diagram which depicts the layers of software used to control the switch of FIG. 1.

FIG. 2 is a layer model of the software used to control the programmable switch 110 of FIG. 1. The lefthand column of FIG. 2 shows seven layers defined in the Open Systems Interconnection (OSI) reference model. The righthand column of FIG. 2 shows five layers used to control the switch 110 and their general correspondence to the OSI model.

Referring now to both FIGS. 1 and 2, the Application Layer 5, which corresponds generally with the Application layer of the OSI model, represents application software which typically runs on either the PC CPU 104 or the external host 130. Application Layer 5 software may be used to implement any of a number of desired telecommunications services such as toll free (800) service, voice mail, automatic call distribution (ACD), to name but a few. Application Layer 5 may communicate with any other layer of the programmable switch through the application program interface (API) of the present invention. When Application Layer 5 resides on external host 130, the API manages communications over communication channel 132. When Application Layer 5 resides on PC CPU 104, the API manages call control processing communications over PC I/O bus 108.

Call Management Layer 4, which corresponds generally with the Presentation, Session and Transport layers of the OSI model, represents software which runs on the CPU/matrix card 112. Call Management Layer 4 is responsible for performing centralized call processing functions and providing a common interface to Application Layer 5 regardless of the type or types of network signalling protocols which may be used within the switch 110. Typically, Call Management Layer 4 performs functions which are required following call setup.

Network Signalling Protocol Layer 3 corresponds generally with the Network layer of the OSI model. The software represented by Network Signalling Protocol Layer 3 runs either on the CPU/matrix card 112 or on line cards which include their own microprocessors, such as line cards 114 or 115 or packet engine card 117, and is responsible for in and out-of-band network signalling supervision as well as network protocol level control of incoming and outgoing calls.

Link Layer 2 corresponds generally with the Data Link layer of the OSI model. Link Layer 2 software runs on the CPU/matrix card 112, the line cards which include their own microprocessors, the DSP card 116 or the packet engine card 117 (each of which includes its own microprocessor) and is responsible for the detection as well as physical transfer of network signalling information across a network or line interface.

Finally, the Physical Layer 1 corresponds to the Physical layer of the OSI model. Line cards 114, 115 and 118 provide physical T1, E1 and analog electrical interfaces, respectively, to the switch 110.

FIGS. 3A and 3B are a tabular listing of representative features and functions provided by each of the software Layers 2–5 of FIG. 2. The present invention may be used as a development tool to develop suitable software to implement any of the features and functions shown in FIGS. 3A and 3B. Illustrative examples of the use of the present invention in the context of each of Layers 2–5 are set forth in U.S. Pat. No. 5,426,694, assigned to the assignee of the present invention, herein incorporated by reference in its entirety.

FIG. 4 is an overall block diagram of a finite state machine development environment, constructed in accordance with a preferred embodiment of the present invention, which enables a customer or user to create and define finite state machines for performing desired telecommunications functions, controlled by one or more applications through the universal API of the present invention. Before considering this figure in detail, the definitions of certain terms should be addressed.

As used herein, the term state refers to a number which represents the current "context" for a particular channel or port. In a preferred embodiment of the present invention, there are three types of states defined: normal, internal and blocking. Normal states can be wait states (i.e., a SEIZE ACK state, a condition in which further action is suspended until the occurrence of a particular event) or stable states (i.e., a conversation is taking place). Internal states are used to test conditions and effectively operate as decision branches. Normal and internal states may be specified by a customer or user, in accordance with present invention, to define a finite state machine for performing a desired function. Blocking states are generated automatically by the present invention and are used, on a channel-by-channel basis, in connection with the management of off-board resources.

An event is a number which identifies a condition which is accepted by a particular state. Data may be associated with an event.

An atomic function is one which performs an elementary task such as setting a timer. User-specified data may be associated with an atomic function. A primitive is a predetermined sequence of atomic functions which is invoked upon the occurrence of a particular event. Users may create or define primitives from a library of available atomic functions. In a preferred embodiment, each primitive may contain up to 20 atomic functions.

A state/event table defines the valid events for a particular state and the primitive which is invoked upon the occurrence of each such event. In a preferred embodiment, a state/event table may contain up to 256 states and up to 20 events per state.

A primitive table defines the primitives which are used by a state/event table. In a preferred embodiment, a primitive table may contain up to 256 primitives.

A protocol is defined as the association of various types of tables, the least of which is a state/event table and primitive table, and is identified by a protocol ID (a number).

An API protocol is defined as the host-to-switch control protocol between host applications and software layers of the switch.

A program protocol language (PPL) is a programmable environment for managing network signalling protocols and communications services.

A data block, such as those denoted by reference numbers 40a . . . 40i, is assigned for each channel (port) 0 . . . i of the switch. Each data block 40a . . . 40i contains the following information pertaining to its respective channel: the current state of the channel; a pointer to an active state/event table; a pointer to an active primitive table; a pointer to an assigned state/event table; and a pointer to an assigned primitive table.

In the case of channel 0, the active state/event table and active primitive table pointers are pointing, as indicated by the phantom lines, to tables which are associated with a resident protocol n+1, denoted by reference number 442a. The assigned state/event table and assigned primitive table pointers for channel 0 are pointing to tables which are associated with a dynamically loaded, customer-defined protocol 0, denoted by reference number 444a.

Other protocols which are present and available for use are customer-defined protocols 1 . . . n (444b . . . 444n) resident protocols n+2 . . . m (442b . . . 442m). The resident protocols 442a . . . 442m represent preprogrammed or "standard" protocols, which are typically provided by a manufacturer with a switch. In contrast, the customer-defined protocols 444a . . . 444m are created by a customer or user and may be completely "custom" or "proprietary" in nature.

A layer dependent atomic function library 446 is connected to provide information to a state machine engine 448. State machine engine 448 is also connected to receive the active state/event table pointer and active primitive table pointer from each of data blocks 440a . . . 440i. Also, utilities are provided for layer dependent environment support 450.

The function of the state machine engine 448 is to drive each channel in accordance with its assigned protocol, which is defined by the assigned state/event table and assigned primitive table. Upon the occurrence of a valid event for a normal state, a primitive is invoked in accordance with the entries in the assigned state/event table. The state machine engine 448 uses the atomic function library 446 to perform the atomic functions represented by the invoked primitive.

The state machine engine 448 will drive through any necessary internal states, automatically generating appropriate blocking states, until the channel once again reaches a normal state. At that time, processing by the state machine engine 448 is complete until the occurrence of another valid event.

Each channel is initially assigned one of the customer-defined protocols or one of the preprogrammed protocols. This is accomplished by the transmission of an API message from the Application Layer 5 to the Call Management Layer 4, which in turn issues an appropriate message to Network Signalling Protocol Layer 3 which may also be configured in accordance with the API of the present invention. The assigned state/event table pointer and assigned primitive table pointer point to the protocol which was last assigned. Thus, a customer may assign a desired one of the available protocols by simply specifying the appropriate pointers in each data block. In this fashion, the present invention advantageously permits the customer to assign, on a channel-by-channel basis, a desired protocol from among multiple protocols resident within a single switch.

Alternatively, or if the customer elects not to assign protocols to some or all of the channels, default values are preferably provided so that each channel always has a valid protocol (e.g., one of the resident protocols 442a–442c) assigned to it.

The active state/event table and active primitive table pointers, which are provided to the state machine engine 448, point to the protocol which is currently controlling the channel.

The protocol assigned to a particular channel is not necessarily permanent and may be dynamically changed in real time in response to the occurrence of a specified event, as described in detail in connection with FIG. 7. Further, because the atomic functions provided by the library 446 represent elementary functions, customers or users are advantageously able to implement desired changes in protocols without substantial, or possibly any, changes to the underlying code. In addition, the environment support utilities are provided to simplify protocol development for the customer or user. The utilities provide ready-to-use resource management functions (e.g., timers) which greatly simplify the state machine logic required to implement desired protocols. Different utilities are preferably provided for each software layer since the resources required by each layer may be different.

In accordance with the present invention, call processing control communications between the Application Layer 5, typically residing on external host 130, and the other layers of switch 102 illustrated in FIG. 2, is conducted though the transfer of generic messages of the universal API of the present invention. Specifically, in the preferred embodiment of the present invention, a single message type having a generic format is used to transfer call control processing information between the host and the telecommunications switch. A PPL Event Request message is used to transfer all call control processing commands and data from the host application (Layer 5) to the telecommunications switch (all other software layers). Likewise, a PPL Event Indication message is used to transfer all call control processing status and data from the telecommunications switch to the host application. These generic API messages have optional fields and are the only messages necessary to maintain call processing regardless of the application requirements, network signalling protocol requirements, or features presently existing or to be added to the telecommunications switch. The programmable switch of the present invention enables a user to define and assign a signalling protocol, either "standard" or custom in nature, for performing various switching functions to accommodate any of the above requirements.

Figure 5:
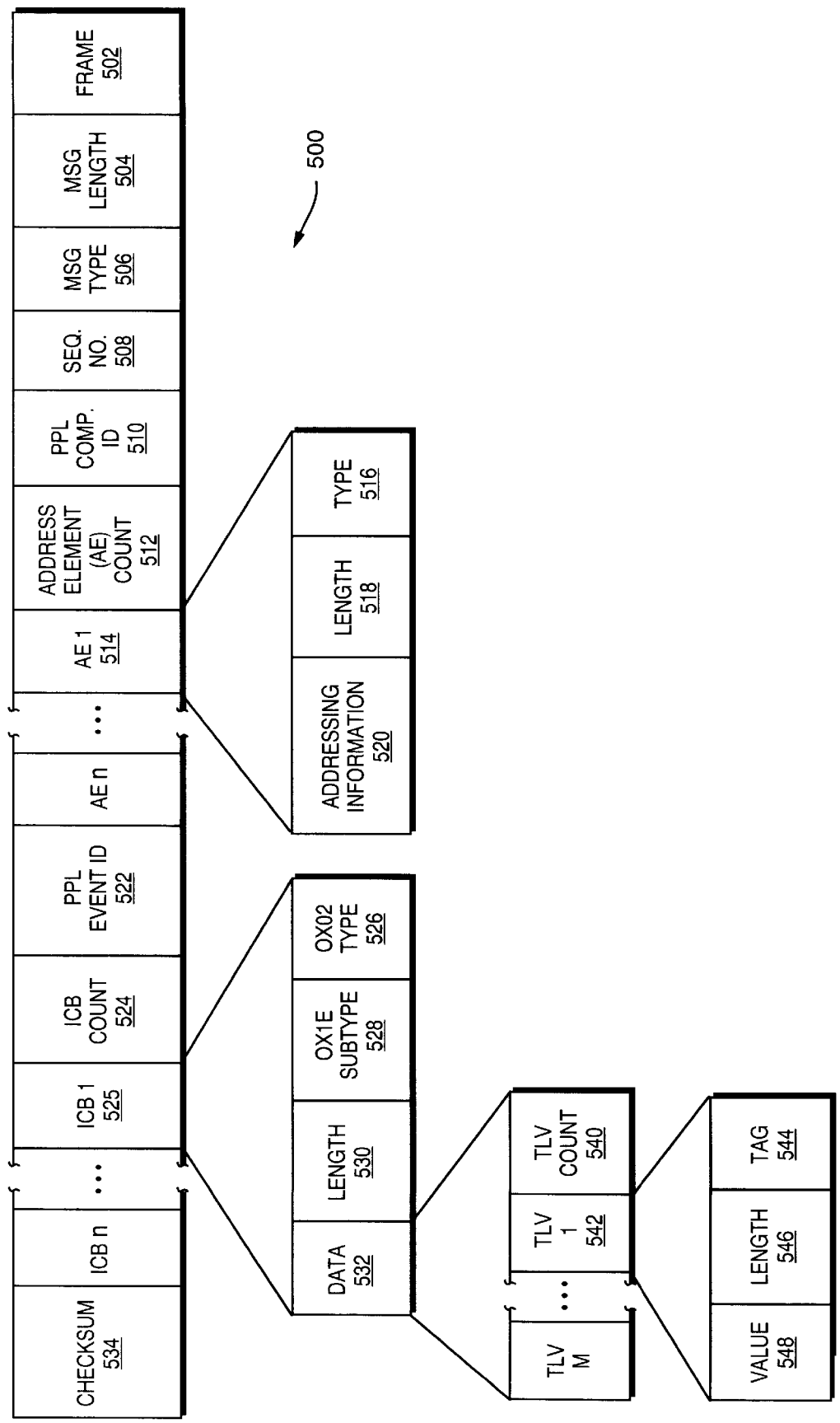
FIG. 5 is a block diagram illustrating the structure and contents of a generic PPL Event Indication and PPL Event Request message of the present invention.

Referring to FIG. 5, a PPL Event Request message is sent from the host to the switch to initiate a host event on a PPL component with optional information control block (ICB) data. The PPL Event Request message is the only call control processing message passed from the host to the switch and, in the preferred embodiment, having the format of message 500 illustrated in FIG. 5. The PPL Event Request message comprises a number of fields and subfields, each of which is described below.

PPL Event Request message includes a frame byte 502 having a constant value identifying it as the first byte of a frame.

Message length field 504 contains the length of the particular PPL Event Request message. This is necessary due to the ability of the generic API messages of the present invention to include optional fields, changing the length of the message. Typically the length field value does not include the frame byte 502.

A message type field 506 contains a constant value identifying the particular message as a PPL Event Request message. The message type field is constant for all PPL Event Request messages.

Sequence number field 508 is a specific numeric identifier assigned to each PPL Event Request message that is generated by the host application. This value is used to distinguish between different PPL Event Request messages transmitted from the host to the switch. For example, when the switch acknowledges the receipt of a PPL Event Request message, it includes the sequence number in its acknowledgment to identify which of the PPL Event Request messages is associated with the status information contained within the acknowledgment.

As noted, every PPL component state machine in a switch is assigned a unique reference number. PPL component ID 510 is a one word field that identifies which PPL component implemented in the switch is referenced by a particular PPL Event Request message 500.

There may be multiple instantiations of a PPL component state machine in a switch at any given time. For example, in the preferred embodiment there is an E1 PPL component state machine assigned to each channel. Thus, in the illustrative embodiment wherein a single E1 card supports 256 channels, there may be as many as 256 instantiations of the E1 PPL component state machine, each associated with a distinct channel. In order to selectively provide access to every instantiation of a PPL component, the universal API of the present invention provides the ability to perform multiple levels of addressing. Thus, once the PPL component has been identified in the PPL component ID field 510, an address element field 514 is provided to identify which instantiation(s) of that PPL component state machine is(are) being referenced. As shown in FIG. 5, the PPL Event Request message provides the ability to include any number of address element fields 514, and thus may simultaneously communicate with multiple instantiations of a single PPL component state machine. The total number of address element fields 514 included in a PPL Event Request message is provided in address element count field 512.

To accommodate the additional levels of addressing noted above, address element field 514 contains a number of subfields for further identifying which state machine instantiation is to receive the PPL Event Request message. Specifically, an address element type field 516 is provided to reference the hierarchical components of the switch that may contain or be associated with the desired state machine instantiation. In the above example of an E1 PPL state machine instantiation, the address element type field 516 indicates which span and channel the state machine instantiation is associated with. An address information subfield 520 provides specific addresses for each of the hierarchical components indicated in the address element type field 516.

Since the addressing information contained in field 520 varies in accordance with the type of device addressed, the length of the AE field 514 may vary and thus is provided in length subfield 518. It is considered to be apparent to one skilled in the relevant art to use other addressing schemes appropriate for a particular PPL component state machine and switch architecture. It should also be noted that, in the above example, a single state machine instantiation exists for each channel since the PPL component state machine is assigned to each channel individually. However, it is considered to be apparent to one skilled in the relevant art that a particular state machine may be configured to manage any number of channels.

The multiple levels of addressing provide the universal API PPL Event Request message with a flexible addressing scheme. This enables a host application, using a single PPL Event Request message, to address a range of state machine instantiations having a common PPL component ID to generate a particular event at all addressed state machines.

Each PPL event has a unique ID relative to each PPL component. The PPL event ID field 522 provides the switch with a user-defined PPL event ID that the switch recognizes as being associated with the particular request. The recipient PPL component maps the unique PPL event ID to a PPL event that is unique to that PPL component.

Each PPL Event Request message may also contain one or more data fields in the form of information control blocks (ICB)s. ICBs are defined for each PPL component based upon the software layer and the communications protocol supported by that PPL component. Thus, any signalling information may be passed between the host and switch using the generic, programmable messages of the present invention.

The total number of ICBs contained in a PPL Event Request message is specified by the ICB Count field 524. Each ICB includes one or more structures comprising an ICB Type field 526, an ICB Subtype field 528, an ICB Length field 530, and an ICB Data field 532. The ICB Type field 526 identifies the type of ICB structure. For example, an ICB structure may be defined as a "data" ICB structure by storing the value of 0×02 in the ICB Type field 526. Other types of ICB structures include action ICB structures. The ICB Subtype field 528 further defines, if necessary, the type of ICB structure. A case in point, we further qualify the data ICB structure by classifying it as a "PPL generic data ICB" in the ICB Subtype field 528. The ICB Length field 530 defines the byte length of the ICB structure, and the ICB Data field 532 contains user-specified or system-default information. The internal structure of an ICB data field 532 is dependent on the contents of the ICB type field 526 and the ICB subtype field 528.

For example, the The ICB Data field 532 for a generic PPL data ICB, comprises a Tag-Length-Value (TLV) Count field 540 and one or more TLV data structures 542. The TLV Count field 540 specifies the total number of TLV data structures 542 in the ICB Data field 532. The TLV data structure 542 comprises a Tag field 544 which defines type of TLV data structure 542, a Length field 546 for specifying the length of the TLV data structure 546 and a Data field 548 for containing the TLV data. The ICB Data field 532 may contain one or more generic/system-default TLV data structures 542 that are predefined for convenience. The system-default TLV data structures 542 include a Date-Time-Stamp structure, a Generic Count structure, a Generic Tag structure, a DSP-Data-List structure, and a BCD Digits Structure. The Data-Time-Stamp structure is used for storing the start time of a call, the current system time and the duration of the call; the Generic Count structure may be used as a counter for any event; and, the Generic Tag structure may be used to apply a label to any call in the state machine. The DSP-Data-List structure provides the host with digits collected by DSPs on the switch. For example, if a calling card is used to make a call, the DSP-Data-List structure stores all digits, including the calling card number and any extensions entered by the user. Thus, the switch passes all digits collected by the DSP to the host in one message. The BCD Digits structure is used for reporting dialed numbers.

Several atomic functions are also provided within the switch (specifically L4 PPL) to support the utilization of these system-default TLV data structures. For example, these functions tests for the presence of a specified buffer, moves data from an incoming buffer to an outgoing buffer and clears the specified outgoing buffer.

Also referring to FIG. 5, a PPL Event Indication message is sent from the switch to the host by a PPL component to report an event at the ports to the host with optional ICB data. The PPL Event Indication message is the only call control processing message passed from the switch to the host and in the preferred embodiment, has the same format as the PPL Event Request message illustrated in FIG. 5. Except as noted below, the fields of the PPL Event Indication message are identical to and perform the same functions as, the analogous fields of the PPL Event Request message discussed above.

As noted above, there may be multiple instantiations of a PPL component state machine. For the PPL Event Indication message, the address element field(s) indicate which instantiation of a particular state machine is actually invoking the atomic function that generates the PPL event indication message.

In the PPL Event Indication message, the PPL event ID field 522 is a specific value representing the occurrence of a specific event in the switch that results in the PPL Event Indication message being sent from the PPL component state machine. As noted, this is managed with an atomic function that is programmed to send the particular PPL Event Indication message in response to the occurrence of a particular event, the PPL Event ID included in the message being programmed by the user.

It is considered to be obvious to one skilled in the relevant art to configure all transfers of information in the switch using the universal API of the present invention, including all layer-to-layer communications. For example, the exemplary communications described in the above-incorporated U.S. Pat. No. 5,426,694 may be replaced with the universal API messages of the present invention.

The PPL components can be layer specific, function specific, interface specific, protocol specific, or channel specific. This enables a host Layer 5 telecommunications application to be as interactive as desired or necessary, accessing each layer of the switch and managing each PPL component regardless of where the component is located. An application can therefore use the universal API interface to manage any PPL component. This provides a consistent and predictable means for managing every PPL component in the switch, regardless of what level of processing is being performing, ranging from, for example, a very detailed signalling analysis, to network signalling, to high-level call routing, to call management connection functions.

In the preferred embodiment of the present invention, the manner in which the data is identified and passed to the host includes the implementation of one or more atomic functions configured to store and retrieve data of a certain type to specific memory locations in conjunction with one or more atomic functions that generate a generic PPL Event Indication providing the host with all previously stored data.

However, as one skilled in the art would find apparent, there are numerous ways in which atomic functions may be configured to pass data in the PPL Event Indication message. For example, a separate atomic function may be implemented to transfer specific types of data in a PPL event indication message.

The short-hand notation for depicting the PPL Event Request and the PPL Event Indication messages is shown in on the bottom of FIG. 5.

Figure 6:
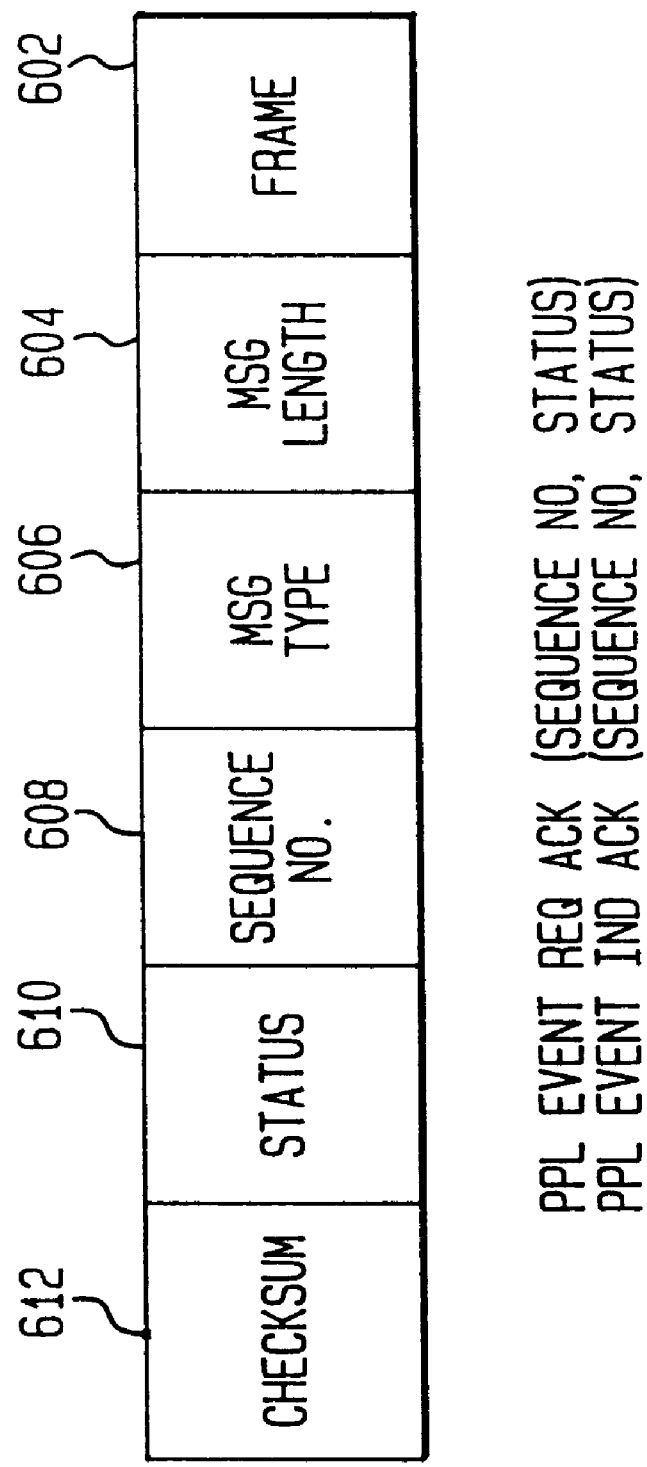
FIG. 6 is a block diagram of a PPL Event Indication Acknowledgment and PPL Event Request Acknowledgment message of the present invention.

In the preferred embodiment of the API of the present invention, a single message type having a generic format is used to transfer response information between the host and the telecommunications switch. Similarly, the host application responds to the PPL Event Indication message with a PPL Event Indication Acknowledge message, also having the format illustrated in FIG. 6. Generic acknowledgment message 600 includes a frame byte 602, length byte 604, message type 606, sequence number 608, and checksum 612 all of which perform the same function as the corresponding fields in the PPL Event Request message 500. In addition, a status field 610 provides the recipient with message-specific status information. The short-hand notation for depicting the PPL Event Request Acknowledge and the PPL Event Indication Acknowledge messages is shown in FIG. 6.

Referring to FIGS. 7A–8G, two examples of the utilization of the universal API of the present invention to perform interactive voice processing functions are provided below. The first example illustrates a universal API for managing host-to-switch communications when the telecommunications switch is controlled by a highly interactive host application Layer 5 to perform interactive voice announcements. The second example illustrates a universal API for managing host-to-switch communications when the host application Layer 5 has limited interaction with the telecommunications switch to perform the same function. These examples illustrate the ability of the universal API to accommodate various applications requirements.

In the following Figures, a state is depicted as a circle, an atomic function is depicted as a rectangular box, and an event is represented by a word abbreviation located along a path leading out of a state. Information shown in parentheses in an atomic function represents arguments or data that are associated with that function. Reference numbers are provided below in parentheses when necessary to avoid confusion with other numeric descriptors.

Figure 7A:
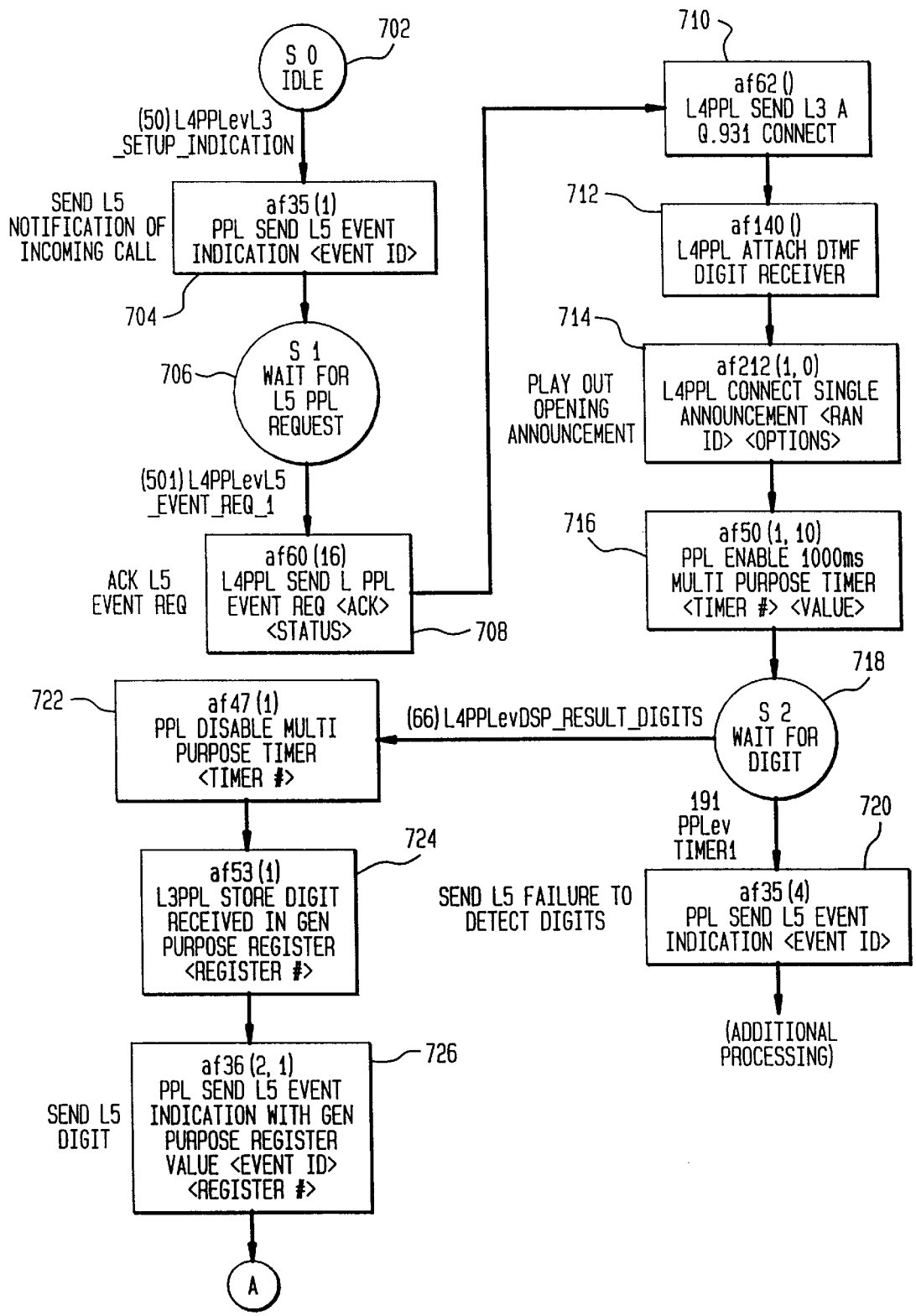
FIGS. 7A and 7B are a state diagram of a finite state machine for providing call control processing utilizing the universal API of the present invention to support a highly interactive host telecommunications application requirement.
Figure 7B:
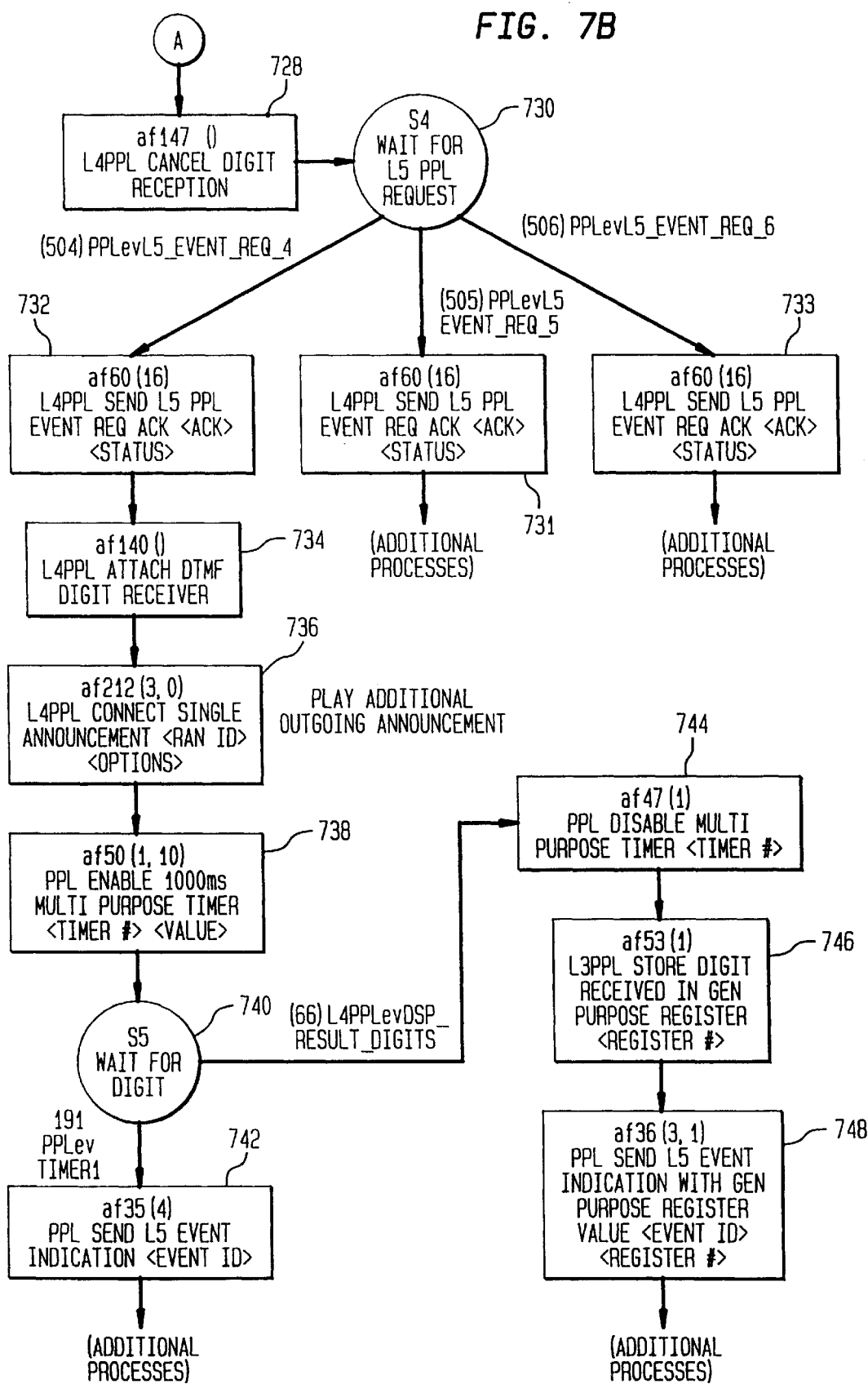

FIGS. 7A–7B illustrate an example of an application of the present invention in Call Processing Layer 4 with a high level of interaction required by the host application layer 5. In this example, the present invention is used to implement a protocol for providing host application decision making throughout the performance of an interactive voice response to an incoming call.

The protocol begins with the associated channel (channel 1) in normal state NS0, which is the IDLE state 702. Upon the occurrence of the event of layer 3 transmitting to layer 4 a setup message ((50)L4PPLevL3__SETUP__INDICATION)), the atomic function af35 is performed. As noted in its descriptor, the Layer 4 PPL event (L4PPLev) is received from network signalling protocol layer 3 (L3), reporting that it has detected an incoming call (SETUP__INDICATION). The number 50 in the parenthetical preceding the message descriptor is the PPL event ID assigned to that event by the Layer 4 PPL. Thus, when Layer 4 is notified of an incoming call, represented by a PPL event ID of 50, the PPL component state machine in FIG. 7A leaves idle state 702 and performs atomic function af35 (704).

Figure 7C:
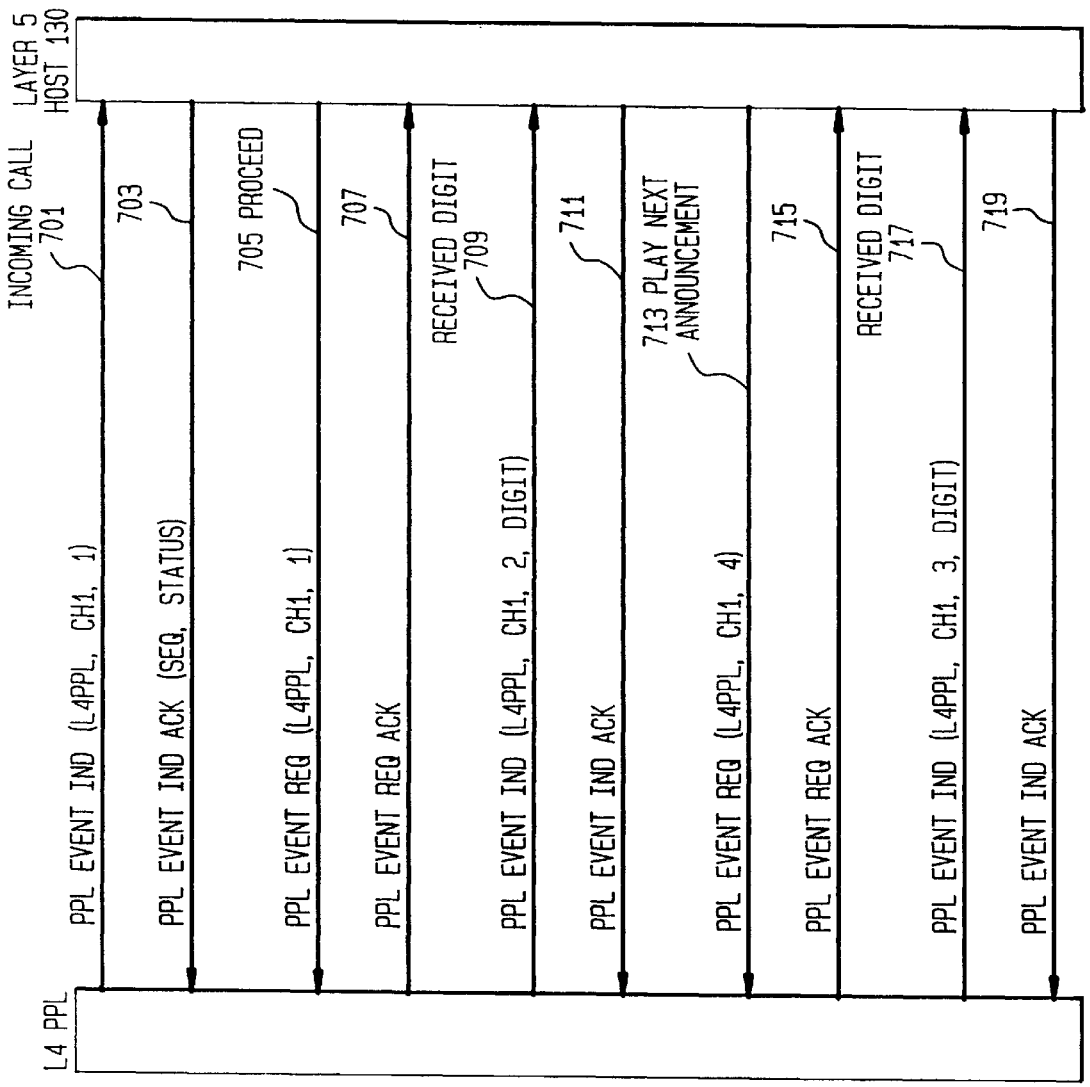
FIG. 7C is an interface diagram of the universal API supporting the call control processing illustrated in FIGS. 7A and 7B.

Atomic function af35 (704) operates to notify the host application (Layer 5) of the event, assigning to the event a PPL event ID of 1. The host application interprets this PPL event ID (the number 1) as a notification of an incoming call. Referring to FIG. 7C, atomic function 35 (704) generates a PPL Event Indication message 701 to notify the host of the incoming call. This PPL Event Indication message has the following format:

PPL Event Ind (L4PPL, ch1, 1)

wherein the PPL component ID indicates the Layer 4 PPL component (L4PPL), the instantiation of the Layer 4 PPL component state machine addressed by this message is the instantiation associated with channel 1 (ch1), and the PPL event ID (1) indicates that an incoming message has been received while the PPL component state machine has been in the idle state NS0.

As shown, the arguments associated with atomic function af35 (704) specify a Layer 4 PPL event ID. Note that more generally, atomic function af35 is a PPL Send Event Indication message atomic function, used whenever a PPL Event Indication message is to be sent to the host Layer 5, each message having arguments for indicating the unique PPL event ID associated with the occurrence of a different event. The host responds with a PPL Event Indication Acknowledge message 703 having the general format:

PPL Event Ind Ack (sequence #, status)

wherein the sequence number is the sequence number provided in the PPL Event Indication message 701, and the status indicates the status of the associated PPL event indication message. For purposes of this and the following examples, the PPL Event Indication Acknowledge messages all indicate that the immediately previous PPL Event Indication message was successfully received.

After the telecommunications switch provides the host with notification of an incoming call utilizing the PPL Event Indication message of the present invention, the Layer 4 PPL component state machine enters normal state NS1, which is a WAIT state 706, during which the Layer 4 PPL component waits for the host application to respond to the notification. The host sends a Layer 5 PPL Event Request message 705 (see FIG. 7C) with an event ID of 1, indicating that it is requesting that the switch proceed with the call received on channel 1. Message 705 has the following format:

PPL Event Req (L4PPL, ch1, 1)

indicating that the switch is to respond to the incoming call received on channel 1. A PPL Event Request message having a PPL Event ID of 1 is interpreted by the Layer 4 PPL component state machine as an event. As illustrated in FIG. 7A, the receipt of this PPL Event Request message is assigned by the Layer 4 PPL component state machine a Layer 4 unique PPL event ID of 501, indicating that a Layer 5 PPL Event Request (with a PPL Event ID of 1) has occurred.

In response to PPL event 501, the Layer 4 PPL component state machine performs 5 atomic functions: atomic function af60 (708), atomic function af62 (710), atomic function afl40 (712), atomic function af212 (714) and atomic function af50 (716). Atomic function af60 is an atomic function that generates a generic PPL Event Request Acknowledge message in accordance with the present invention. This atomic function af60 may be used whenever a PPL component of the switch is to acknowledge the receipt of a PPL Event Request message. The argument number 16 represents an acknowledgment status that the PPL Event Request message was successfully received. This atomic function af60 (708) generates the PPL Event Request Acknowledge message 707, having the same general format as the PPL Event Indication Acknowledge message described above. The PPL Event Request Acknowledge message 707 indicates that the above incoming message has been successfully received.

Atomic functions af62 (710) and atomic function af140 (712), serve, respectively, to send a connect message (to answer the call) to Layer 3 and to send a message to allocate a DSP resource for interactive digit string collection. Atomic function af212 (714) plays an opening announcement to the caller. As shown, there are two arguments to af212: an announcement ID and an announcement control option. af212 (714) was selected to play an opening announcement. Atomic function af50 (716) is performed to set a timer to wait for a selected period of time for receipt of incoming digits, entered in response to the announcement played by atomic function af212 (714). As shown, the first argument indicates that the multi-purpose timer to be used for performing this function is timer1. The second argument indicates the number of 1000 ms units the timer is to count. Here, the second argument is 10, indicating that timer1 will count for 10 seconds. Thus, atomic function af50 (716) enables timer1 to expire in 10 seconds, during which time the Layer 4 PPL component enters normal state S2, which is WAIT state 718, wherein the PPL state machine waits for a digit to be detected on channel 1.

If the next PPL event is the expiration of timer1 ((191) PPLevTIMER1) indicating that no digits were received with the 10 second period, atomic function af35 (720) is performed to inform the host that no digits were received. The receipt of a PPLevTIMER1 message is assigned a PPL event ID of 191 by Layer 4 PPL component. As noted, atomic function 35 generates the PPL Event Indication message of the present invention. Here, however, a PPL Event ID of 4 is included in the PPL Event Indication message, indicating that there has been a failure to detect digits on the selected channel. The format of this PPL Event Indication message is, therefore:

PPL Event Ind (L4PPL, ch1, 4)

indicating that no digits have been detected on the channel associated with the channel 1 instantiation of the Layer 4 PPL component while the Layer 4 PPL component was in the wait state 718.

Since the interface diagram of FIG. 7C illustrates the universal API protocol associated with the successful receipt of digits and subsequent processing of the call announcement, this message is not illustrated in FIG. 7C. Processing then continues with a series of atomic functions not shown where, under host application control through the implementation of the universal API of the present invention, the telecommunications switch performs various functions in response to the failure to detect digits on channel 1.

If the next event to occur while the Layer 4 PPL component state machine is in wait state 718 is the receipt of a message indicating that digits have been detected on channel 1, ((66)L4PPLevDSP_RESULT_DIGITS), atomic function af47 (722) is performed. The receipt of this message is assigned a unique PPL Event ID of 66. Thus, when Layer 4 is notified that digits have been received, the Layer 4 PPL component state machine leaves wait state S2 (718) and performs atomic function af47 (722). Atomic function af47 disables the PPL multipurpose timer (timer1) selected by atomic function af50 (716), as indicated in the argument to the atomic function. Atomic function af53 (724) stores the received digits in a selected general purpose register. Here, af53 (724) stores the received digit in general purpose register 1.

In accordance with the present invention, atomic function af36 (726) is an atomic function configured to send a PPL Event Indication message with the contents of a selected general purpose register (argument 2), with a PPL event ID (argument 1). Here, atomic function af36 (726) sends the contents of the general purpose register 1 to the Layer 5 host application as a PPL Event Indication message 709 having an Event ID of 2. PPL Event Indication message 709 has the format PPL Event Ind (L4PPL, ch1, 2, digit)

wherein L4PPL is the PPL component ID, ch1 is the address element, 2 is the PPL event ID, and "digit" is the received digit. This PPL Event Indication message exemplifies the capability of the universal API of the present invention to transfer data as well as commands utilizing a single generic PPL Event Indication message format. The host responds with a PPL Event Indication Acknowledgment message 711, indicating that the PPL Event Indication message 709 was successfully received. Atomic function afl47 (728) is then performed to cancel digit reception by disconnecting the DTMF receiver from channel 1.

The Layer 4 PPL component state machine then enters state S4 which is a WAIT state 730, wherein the Layer 4 PPL component state machine will wait indefinitely for the host application Layer 5 to direct the Layer 4 PPL component state machine how to respond to the digit that was received. As shown in FIG. 7B, in the exemplary embodiment, the host application may send the Layer 4 PPL component any one of 3 different responses, having PPL Event ID 504, 505, and 506.

If a PPL Event Request message 713 having a PPL event ID of 4 is received by the Layer 4 PPL component state machine, ((504)PPLevL5_EVENT_REQ_4) the Layer 4 PPL component state machine assigns a Layer 4 unique PPL event ID 504 to it, indicating that Layer 5 provided a PPL Event Request message having a PPL event ID of 4. PPL Event Request message 711 directs the Layer 4 PPL component state machine to play a specific outgoing announcement. The format of PPL Event Request message 713 is:

PPL Event Req (L4PPL, ch1, 4)

wherein the PPL component ID indicates that the message is directed towards the Layer 4 PPL component (L4PPL), the address element indicates that channel 1 is the channel by which the communication is occurring (ch1), and the PPL event ID (4) indicates that a specific additional outgoing announcement is to be played on the identified channel.

In response to PPL event 504, Layer 4 performs 4 atomic functions: atomic function af60 (732), atomic function af140 (734), atomic function af212 (736) and atomic function af50 (738). Atomic function af60 (732) is an atomic function that generates a generic PPL Event Request Acknowledge message in accordance with the present invention. As noted, atomic function af60 is used whenever a PPL component is to acknowledge the receipt of a PPL Event Request message.

The argument number 16 represents an acknowledgment status that the PPL Event Request message was successfully received. This atomic function generates the PPL Event Request Acknowledge message 764, having the general format described above.

Atomic function af140 (734) serves to allocate a DSP resource for interactive digit string collection to channel 1. Atomic function af212 (736) plays an additional outgoing announcement on channel 1. An announcement ID of 3 is indicated by the first argument; no options were selected according to the second argument. Atomic function af50 (738) is performed to set timer1 to wait for a 10 seconds for receipt of incoming digits. The PPL component enters state S5 (740) to wait for the incoming digit for the selected period of time.

The performance of atomic function af212 (736) results in the playing of an announcement to the caller. As shown, there are two arguments to af212: the announcement ID and announcement control options. Atomic function af212 (736) was selected to play an outgoing announcement.

Atomic function af50 (738) is performed to set a timer to wait for a selected period of time for receipt of incoming digits, entered in response to the announcement played by atomic function af212 (736). In accordance with the arguments, atomic function af212 (736) sets timer1 to expire in 10 seconds. During this period, the Layer 4 PPL component state machine enters state S5, which is a WAIT state 740 wherein the state machine waits for digits to be received.

In this exemplary embodiment, the host may have alternatively responded with either a PPL Event Request having a PPL event ID of 5 or 6 indicating to the Layer 4 PPL Component to perform other functions not shown. In both cases, the PPL component state machine performs atomic function af60 (731,733, respectively), indicating that the respective PPL Event Request message was successfully received.

If the next event is the expiration of timer1((191) PPLevTIMER1), the protocol again performs an atomic function af35. Atomic function af35 (742) is performed to inform the host that no digits were received within the allotted time. As noted, atomic functions af35 are configured to generate a PPL Event Indication message in accordance with the present invention. Here, a PPL Event ID of 4 is included in the PPL Event Indication message by atomic function af35 (742), indicating that there has been a failure to detect digits on the selected channel. The format of this PPL Event Indication message is:

PPL Event Ind (L4PPL, ch1, 4)

indicating that for the channel 1 instantiation of the Layer 4 PPL Component, no digits were detected within the allotted time. Since the interface diagram of FIG. 7C illustrates the API protocol associated with the successful processing of the call announcement sequence, this message is not illustrated in that Figure.

If the next PPL event is the expiration of timer1 ((191) PPLevTIMER1) indicating that no digits were received within the 10 second period, atomic function af35 (742) is performed to inform the host that no digits were received by generating the PPL Event Indication message of the present invention with a PPL Event ID of 4, the format of which is:

PPL Event Ind (L4PPL, ch1, 4)

For reasons given above, this is not shown in FIG. 7C. Processing then continues with a series of atomic functions not shown where, under host ampliation control through the implementation of the universal API of the present invention, the telecommunications switch performs various functions in response to the failure to detect digits on channel 1.

If the next event to occur while the Layer 4 PPL component state machine is in wait for digit state 740, is the receipt of a message indicating that digits have been detected on channel 1, ((66)L4PPLevDSP_RESULT_DIGITS), atomic functions af47 (744), af53 (746) and af36(748) are performed to disable the PPL multipurpose timer (timer1) previously selected, storing the received digits in a selected general purpose register, and sending a PPL Event Indication Message 717, respectively.

In accordance with the present invention atomic function af36 (748) is an atomic function configured to send a PPL Event Indication message with the contents of general purpose register 1 with a PPL event ID of 3. Here, atomic function af36 (748) sends the contents of the general purpose register 1 to the Layer 5 host application as a PPL Event Indication message 717 having an Event ID of 3. PPL Event Indication message 717 has the format:

PPL Event Ind (L4PPL, ch1, 3, digit)

wherein L4PPL is the PPL component ID, ch1 is the address element, 3 is the PPL event ID, and "digit" is the received digit. This event ID indicates that the returned digit is in response to an af212 atomic function playing an outgoing announcement having at announcement ID of 3. The host responds with a PPL Event Indication Acknowledgment message 719, indicating that the PPL Event Indication message 711 was successfully received.

Figure 7D:
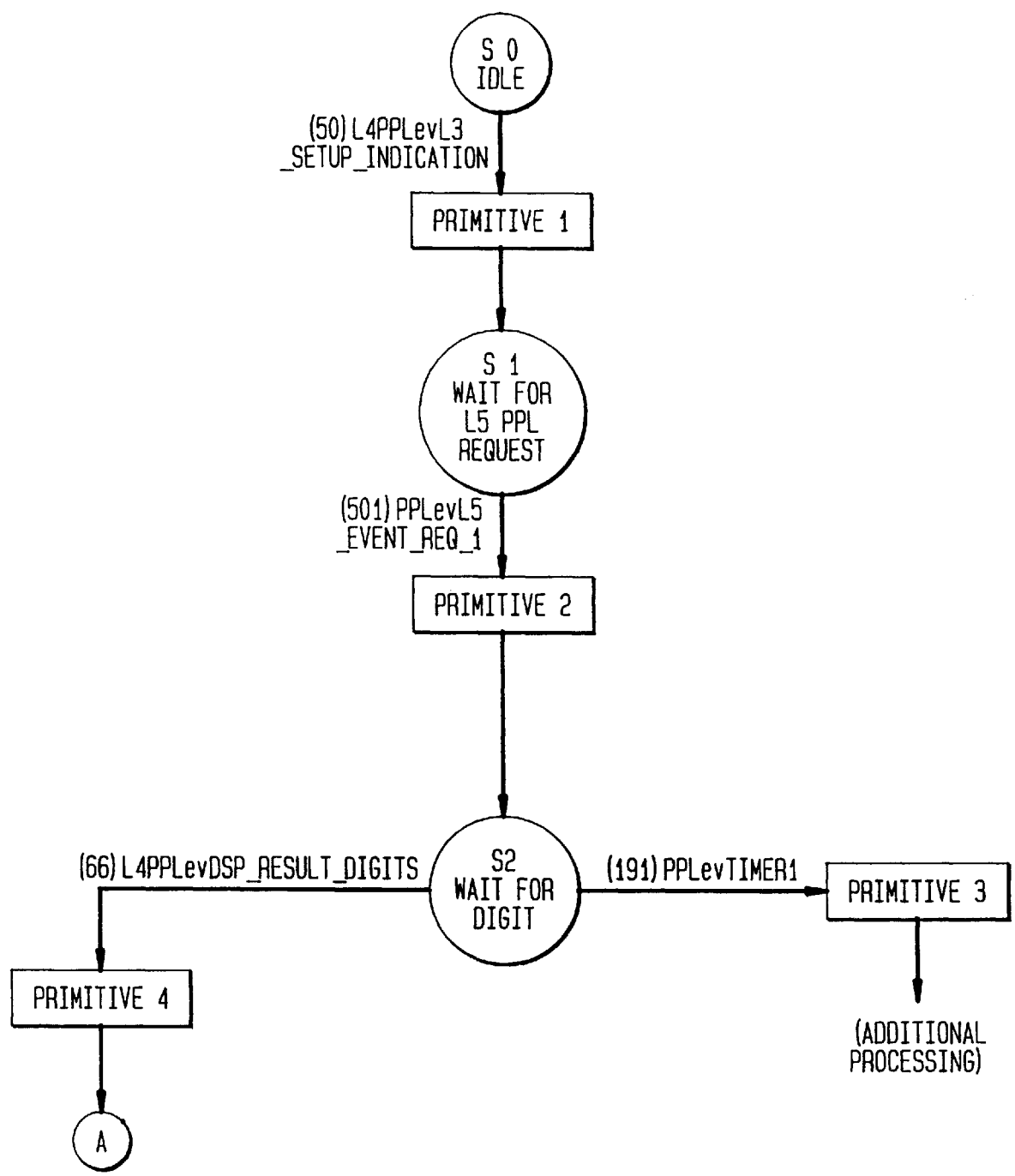
FIGS. 7D and 7E are a diagram of the finite state machine of FIGS. 7A and 7B in which each series of atomic functions is defined as a primitive.

Referring now to FIG. 7D, it may be seen that the each sequence of atomic functions shown in FIGS. 7A–7B has been defined as a primitive. In effect, each primitive provides a shorthand way to identify a desired sequence of atomic functions to invoke. The table of FIG. 7D lists in tabular format the sequence of atomic functions for each primitive.

Figure 7E:
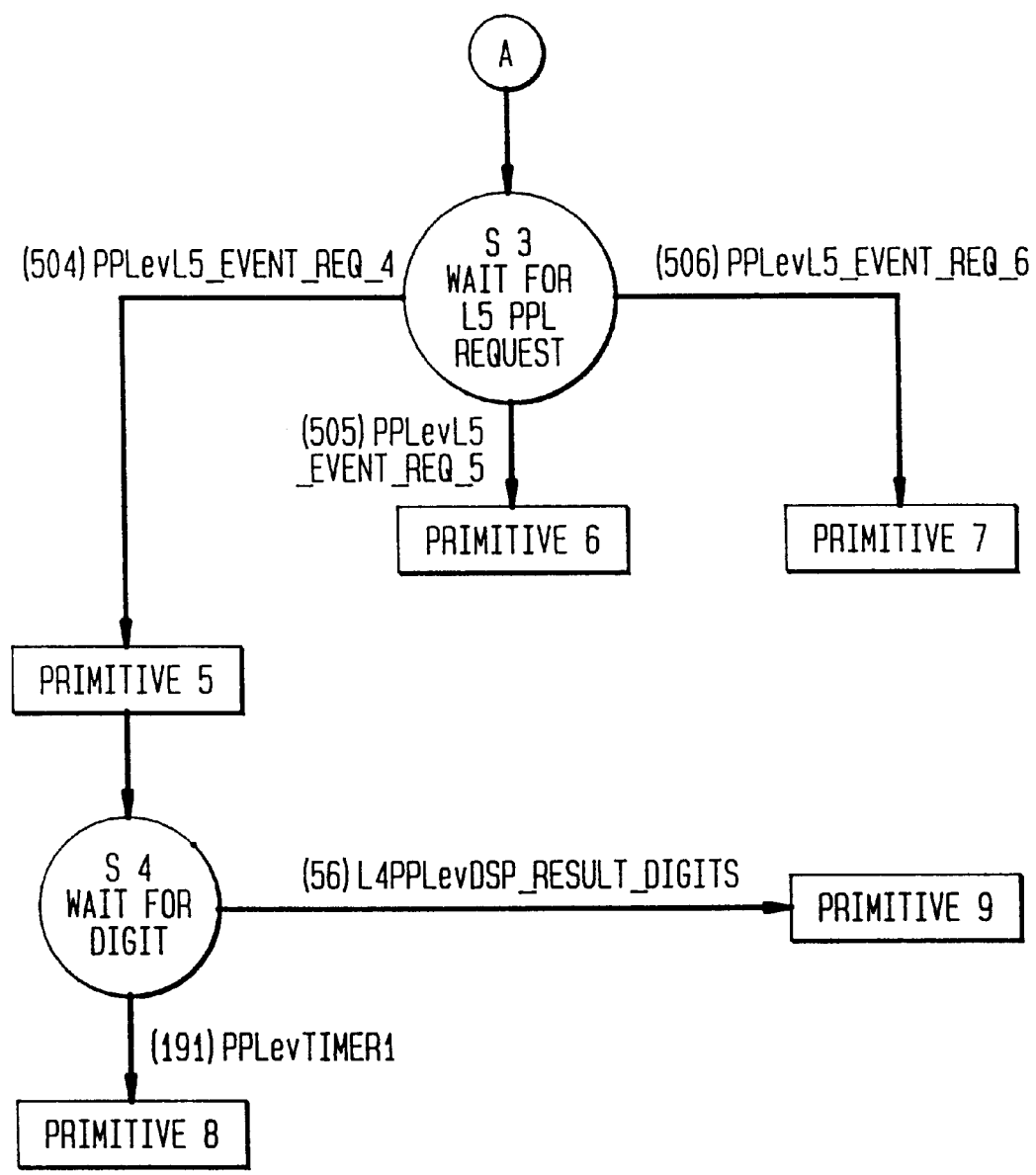

FIG. 7E is a state/event table that defines the relationships between the states, events and primitives of FIG. 7D. In accordance with a preferred embodiment of the present invention, a customer wishing to create the protocol depicted in FIGS. 7A–7B., would need only define the tables shown in FIG. 76D and 7E. Those tables would then be downloaded to the switch 102 (FIG. 1) through a series of messages from the host device.

Referring to FIGS. 8A–8G, a second example of the universal API of the present invention configured to manage host-to-switch communications is illustrated. IN this example, the host application Layer 5 has limited interaction with the telecommunications switch while performing these functions. Specifically, the telecommunications switch is configured to automatically respond to the digits that are entered. In contrast to the previous example, the Layer 4 PPL state machine includes internal states responsive to prompts internally generated during digit collection. These aspects of the switch replace the atomic functions generating PPL Event Indication messages to the host providing the received digit, and the subsequent wait states wherein the switch waits for the host to supply it with a PL Event Request message.

Figure 8A:
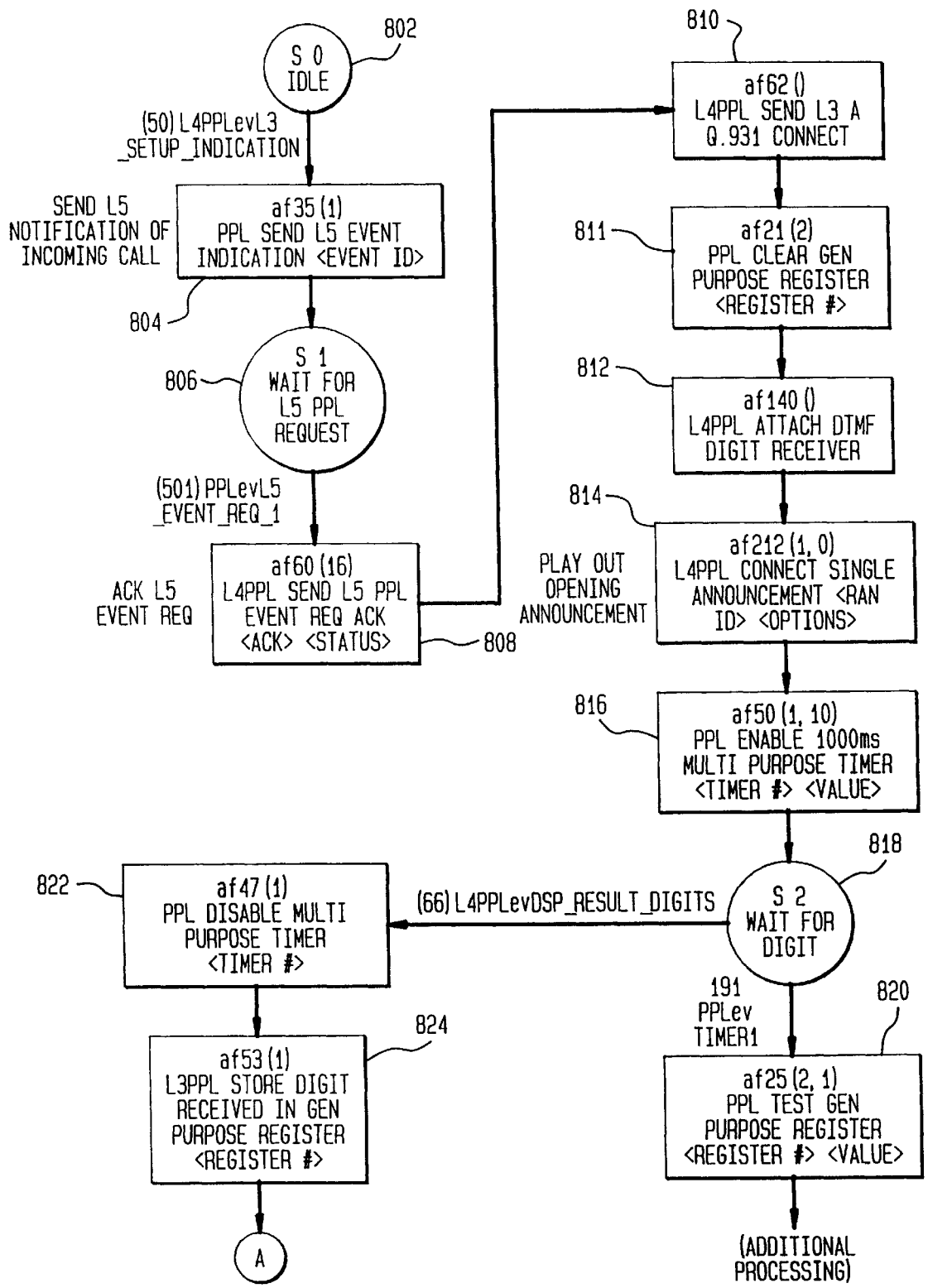
FIGS. 8A and 8B are a state diagram of a finite state machine for providing call control processing utilizing the universal API of the present invention to support a limited interactive host telecommunications application requirement.
Figure 8B:
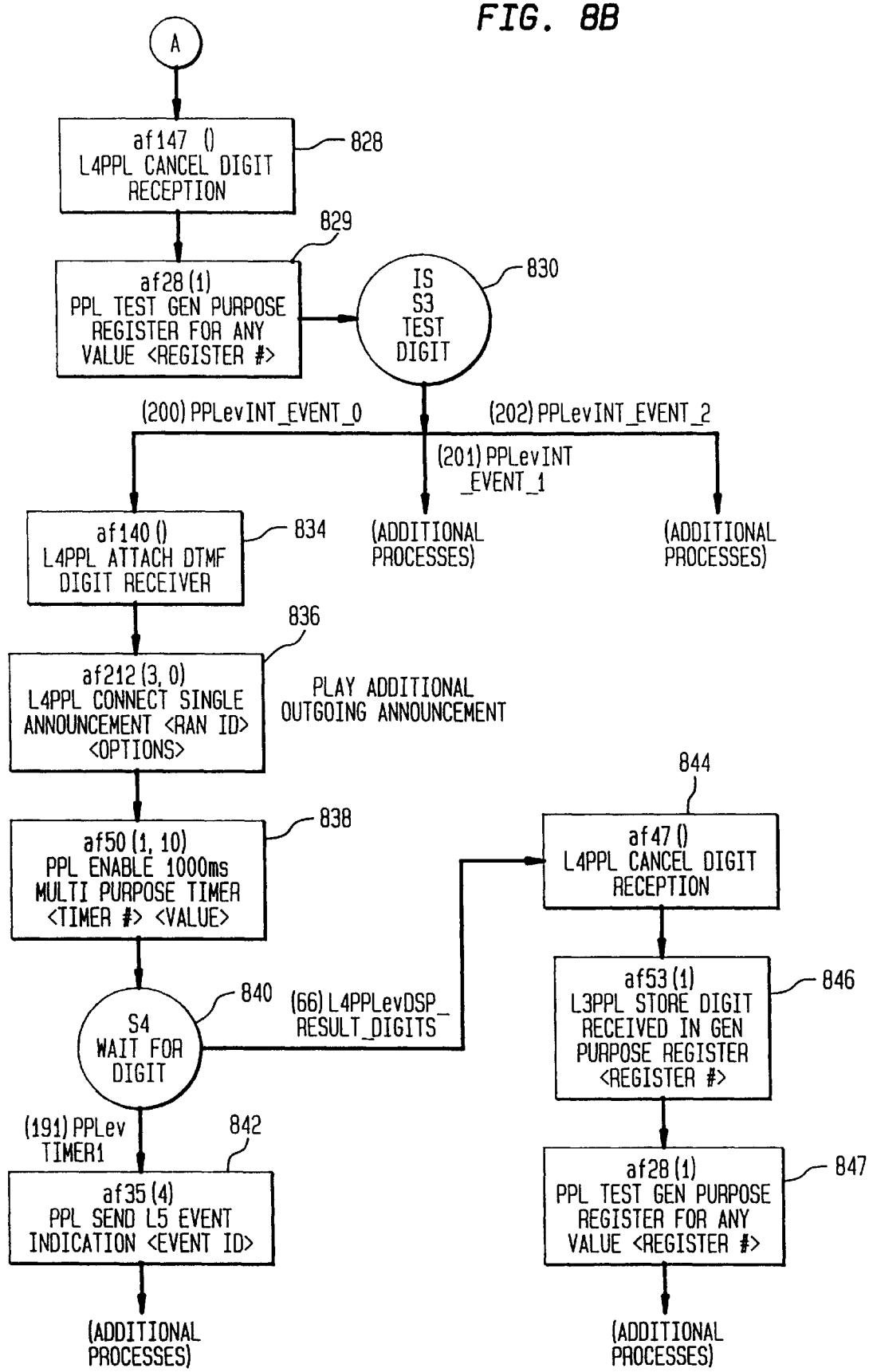

FIGS. 8A–8B illustrate an example of an application of the present invention in Call Processing Layer 4 with a limited level of interaction required by the host application Layer 5 to implement a protocol for providing limited host application decision making in the performance of an interactive voice response to an incoming call.

The protocol begins with the associated channel (channel 1) in normal state S0, which is the IDLE state 702. Upon the occurrence of the event of layer 3 transmitting to layer 4 a setup message ((50)L4PPLevL3_SETUP_INDICATION)), the PPL component state machine in FIG. 8A leaves idle state 802 and performs atomic function af35 (804).

Figure 8C:
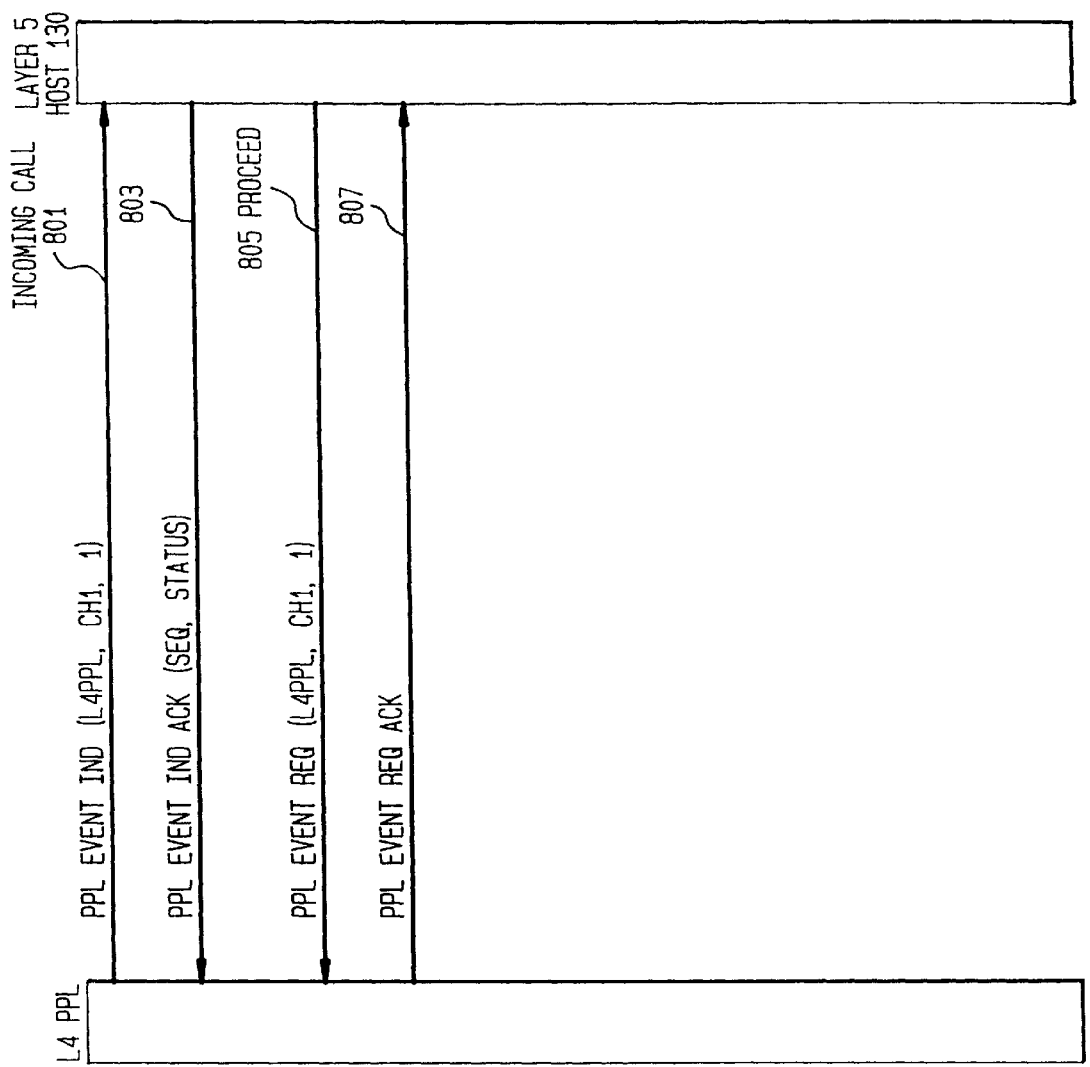
FIG. 8C is an interface diagram of the host-to-switch API generated by the cal control processing illustrated in FIGS. 8A and 8B.

Atomic function af35 (804) operates to notify the host application (Layer 5) of the event, assigning to the event a PPL event ID of 1. The host application interprets this PPL event ID value of 1 as a notification of an incoming call. Referring to FIG. 8C, atomic function 35 (804) generates a PPL Event Indication message 801 to notify the host of the incoming call. This PPL Event Indication message has the same format as PPL Event Indication message 701, and indicates that the channel 1 instantiation of the Layer 4 PPL component state machine addressed by this message received an incoming message while the Layer 4 PPL component state machine was in the idle state.

The host responds with a PPL Event Indication Acknowledge message 803 having the general format described above, indicating that the previous PL Event Indication message was successfully received.

After the telecommunications switch provides the host with notification of an incoming call utilizing the PPL Event Indication message of the present invention, the Layer 4 PPL component state machine enters normal state S1, which is the WAIT state 706, during which the Layer 4 PPL component waits for the host application to respond to the notification. The host sends a Layer 5 PPL Event Request message 705 with an event ID of 1, indicating that it is requesting that the switch proceed with the call received on channel 1. This message has the format described above, indicating that an incoming message has been received on channel 1 for that instantiation of the Layer 4 PPL component while the Layer 4 PPL component state machine has been in the idle state.

The receipt of this PPL Event Request message is identified by the Layer 4 PPL component state machine as a PPL event and is assigned a Layer 4 unique PPL event ID of 501, indicating that a Layer 5 PPL Event Request (1) has occurred.

In response to PPL event 501, the Layer 4 PPL component state machine performs six atomic functions: atomic function af60 (808), atomic function af62 (810), atomic function af21 (811), atomic function af140 (812), atomic function af212 (814) and atomic function af50 (816). As noted, atomic function af60 is used whenever a PPL component is to acknowledge the receipt of a PPL Event Request message. The argument number 16 represents an acknowledgment status that the PPL Event Request message was successfully received. This atomic function af60 (808) generates the PPL Event Request Acknowledge message 807, having the same general format as the PPL Event Indication Acknowledge message described above. The PPL Event Request Acknowledge message 807 indicates that the above incoming message has been successfully received.

Atomic functions af62 (810), af140 (812), af212 (814) and af50 (816) perform the same function as the analogous atomic functions described above with reference to FIG. 7A. Atomic function af50 (816) enables timer1 to expire during which time the Layer 4 PPL component enters normal state S2, which is WAIT state 818, wherein the PPL state machine waits for a digit to be detected on channel 1.

As in the above example, if the next PPL event is the expiration of timer1 ((191) PPLevTIMER1) indicating that no digits were received within the selected waiting period, atomic function af35 (820) is performed.

If the next event to occur while the Layer 4 PPL component state machine is in wait state 818 is the receipt of a message indicating that digits have been detected on channel 1, ((66)L4PPLevDSP_RESULT_DIGITS), atomic functions af47 (822), af53 (824), and af47 (828) are performed. These atomic functions performs similar functions to the analogous atomic functions described above with reference to FIGS. 7A and 7B. Note that an atomic function analogous to af36 (726) is not invoked. Thus, the received digit is not provided to the host application.

Atomic function af28 (829) is performed to test the value of the digit stored in the general purpose register used in atomic function af63 (824) to store the received digit. The Layer 4 PPL component state machine enters internal state IS3 which is a TEST state 830, wherein the Layer 4 PPL component state machine tests the value of the digit that was received and stored in general purpose register 1. As shown in FIG. 7B, in the exemplary embodiment, the tested digit may have any one of 3 different values, each generating an internal event having PPL Event ID 200, 201, and 202.

If a PPL Internal Event message having a PPL event ID of 0 ((200)PPLevINT_EVENT_0) is provided to the Layer 4 PPL component state machine, the Layer 4 PPL component state machine assigns a Layer 4 unique PPL event ID 200 to it to indicate that the internal event having a PPL event ID of 0 was received.

In response to PPL event 200, the Layer 4 PPL component state machine performs 3 atomic functions af140 (834), af212 (836) and atomic function af50 (838), each of which perform functions similar to the analogous atomic functions described above with reference to FIGS. 7A and 7B. Note that an atomic function analogous to af60 (732) is not performed since the switch tests the incoming digit itself, and does not wait for a host generated PPL Event Request message. Therefore, no acknowledgment is required to be generated.

The Layer 4 PPL component state machine then enters normal state NS4, which is a WAIT state 840 wherein the state machine again waits for digits to be received.

If no digits are received, the next event is the expiration of timer1((191) PPLevTIMER1), the protocol performs an atomic function af35 (842) to inform the host that no digits were received within the allotted time. Processing then continues with a series of atomic functions not shown where, under host ampliation control through the implementation of the universal API of the present invention, the telecommunications switch performs various functions in response to the failure to detect digits on channel 1.

If the next event to occur while the Layer 4 PPL component state machine is in wait for digit state 840, is the receipt of a message indicating that digits have been detected on channel 1, ((66)L4PPLevDSP_RESULT_DIGITS), atomic functions af147 (844), af53 (846) are performed. These atomic functions perform similar functions to the analogous atomic functions described above with reference to FIGS. 7A and 7B. Further, atomic function af28 (847) is performed to test the value of the now second received digit stored in general purpose register 1. A function analogous to atomic function af36 (748) is not performed, thereby not providing the host with a PPL Event Indication message.

Figure 8D:
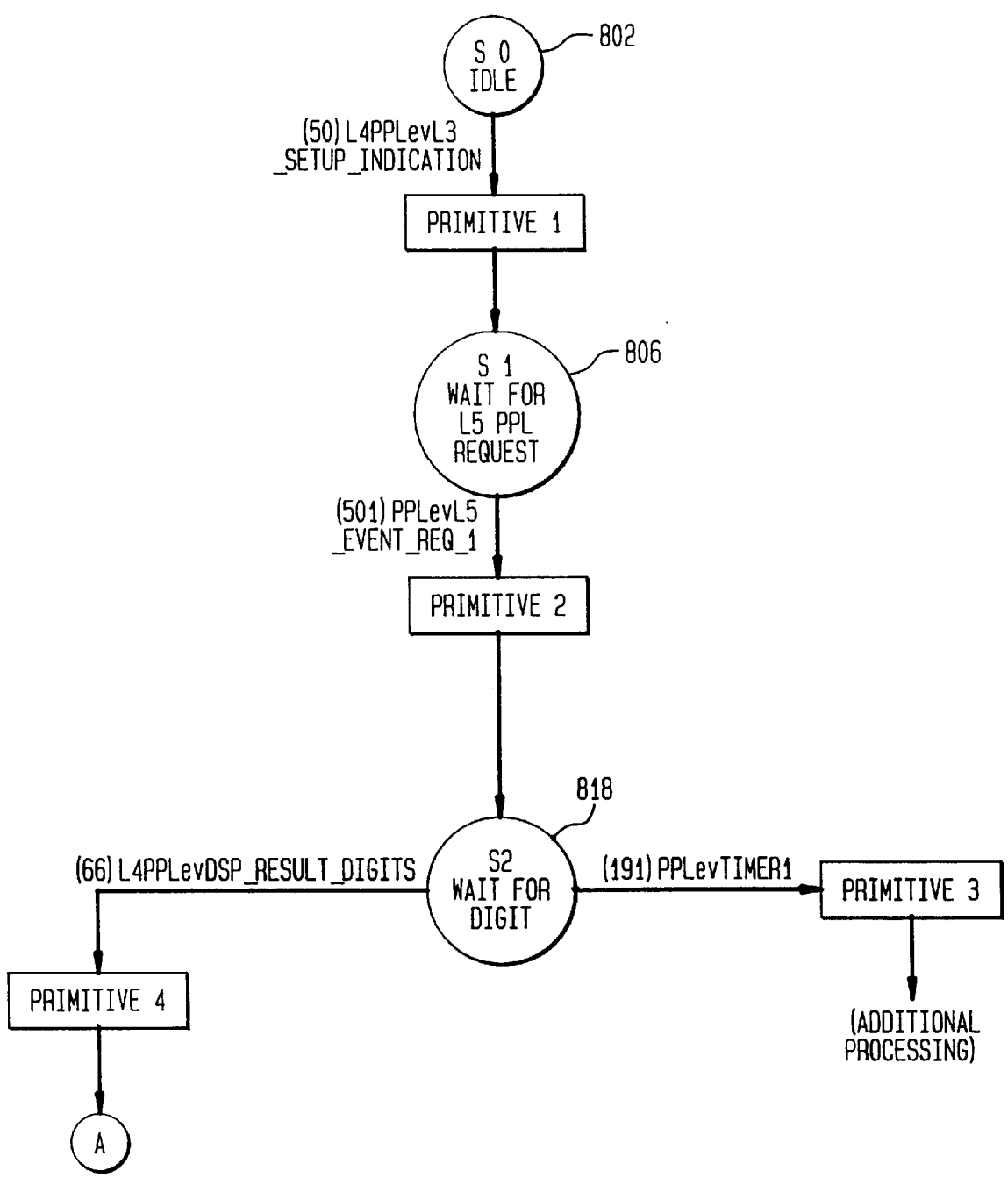
FIGS. 8D and 8E are a diagram of the finite state machine of FIGS. 8A and 8B in which each series of atomic functions is defined as a primitive.
Figure 8E:
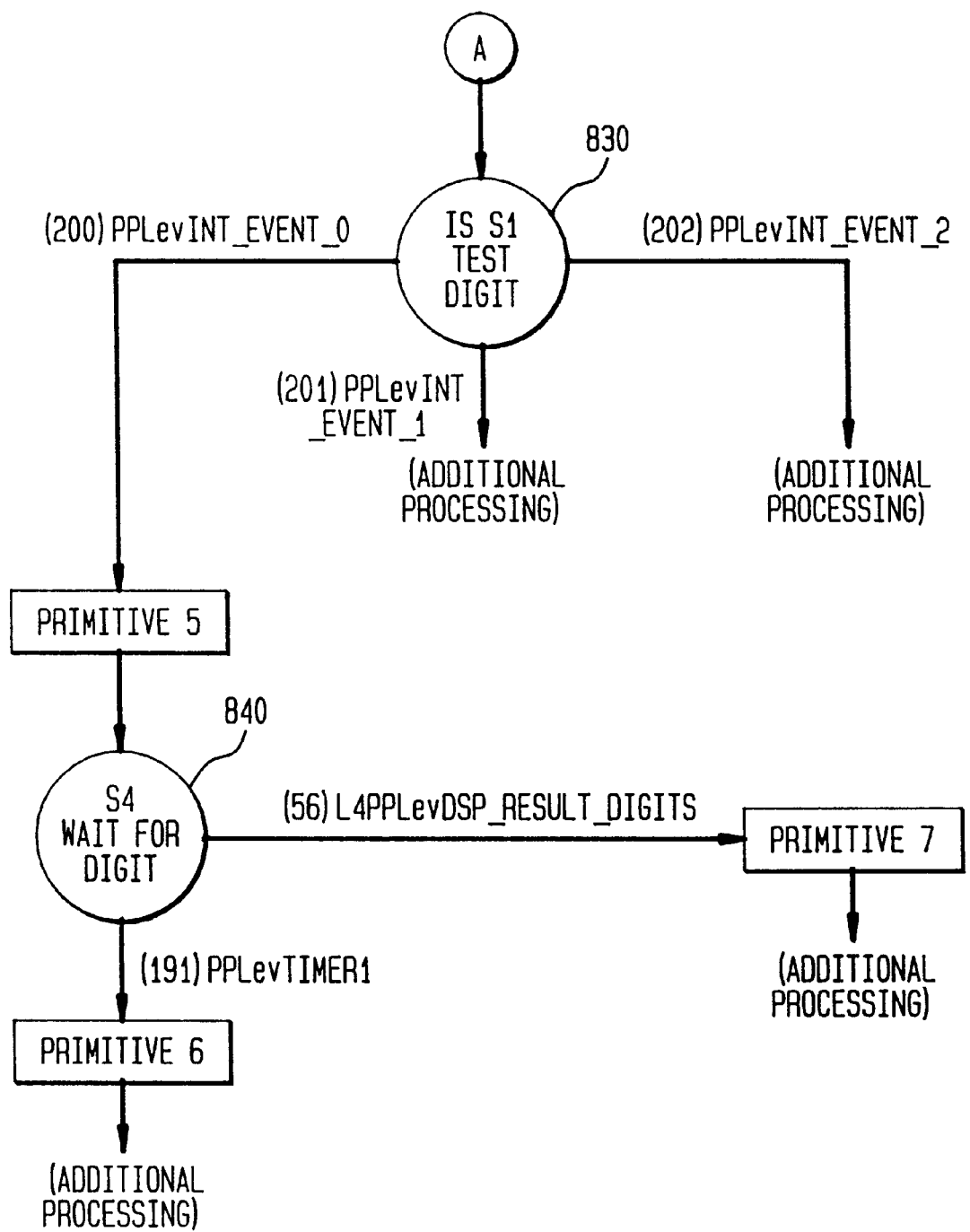

Referring now to FIG. 8D–8E, it may be seen that the each sequence of atomic functions shown in FIGS. 8A–8B has been defined as a primitive. In effect, each primitive provides a shorthand way to identify a desired sequence of atomic functions to invoke. The table of FIG. 8F lists in tabular format the sequence of atomic functions for each primitive.

FIG. 8G is a state/event table that defines the relationships between the states, events and primitives of FIG. 8D. In accordance with a preferred embodiment of the present invention, a customer wishing to create the protocol depicted in FIGS. 8A–8B, would need only define the tables shown in FIG. 8D and 8E. Those tables would then be downloaded to the switch 110 (FIG. 1) through a series of messages from the host device.

Figure 9:
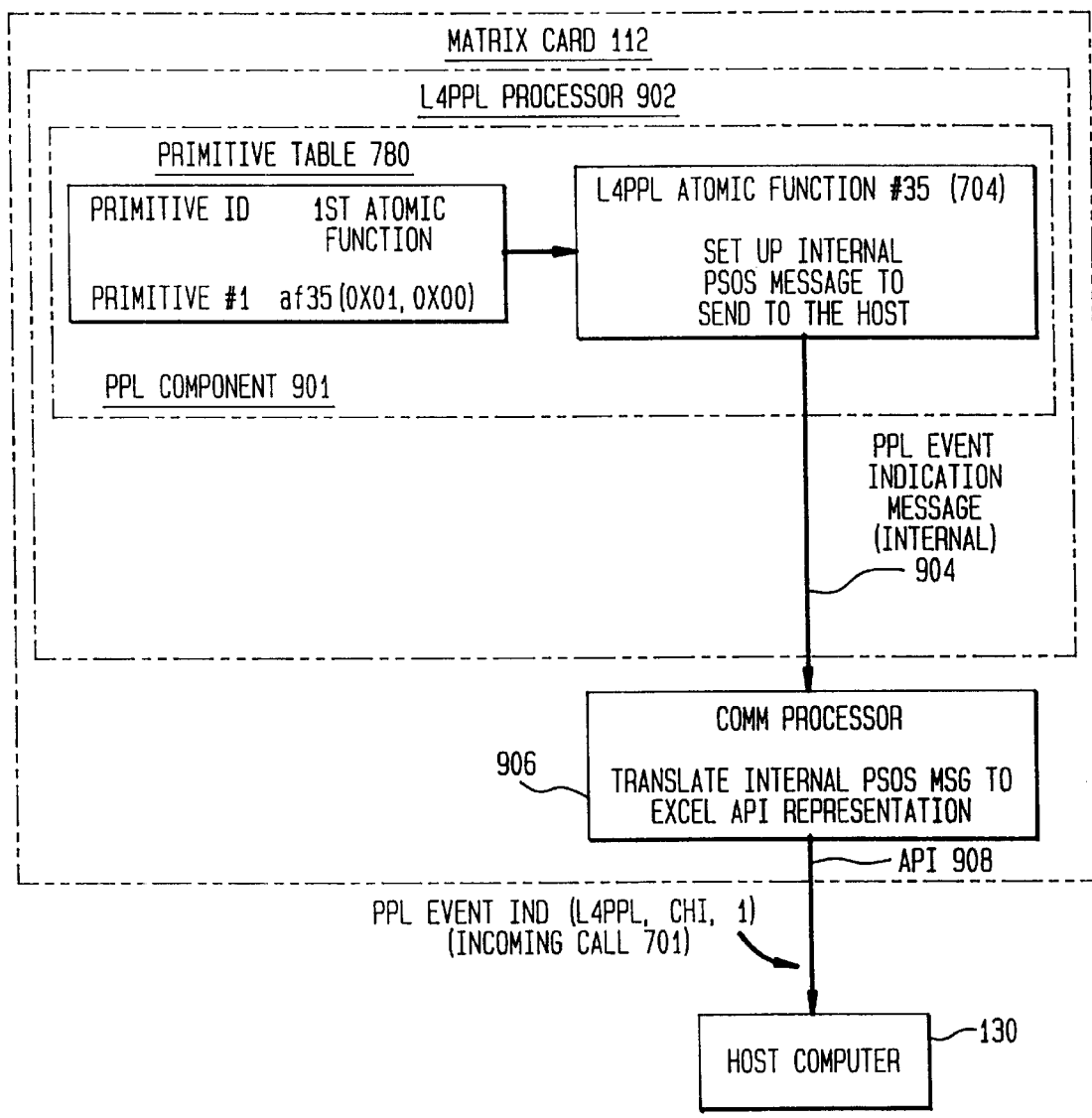
FIG. 9 is a functional block diagram illustrating an exemplary process flow to create a PPL Event Indication message.
Figure 10:
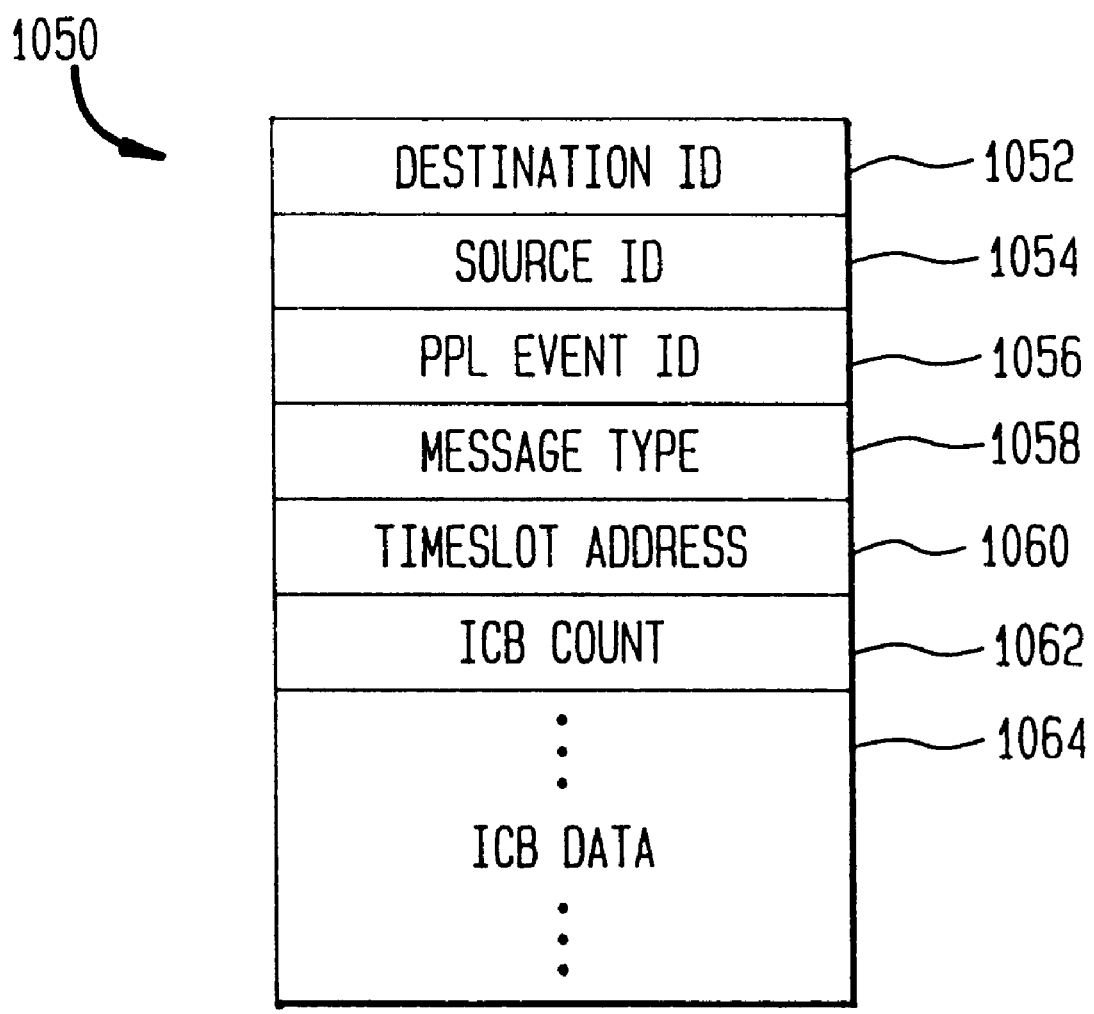
FIG. 10 is a block diagram of the message buffer created by an Layer 4 PPL processor during the creation of the PPL Event Indication message of FIG. 9.
Figure 11:
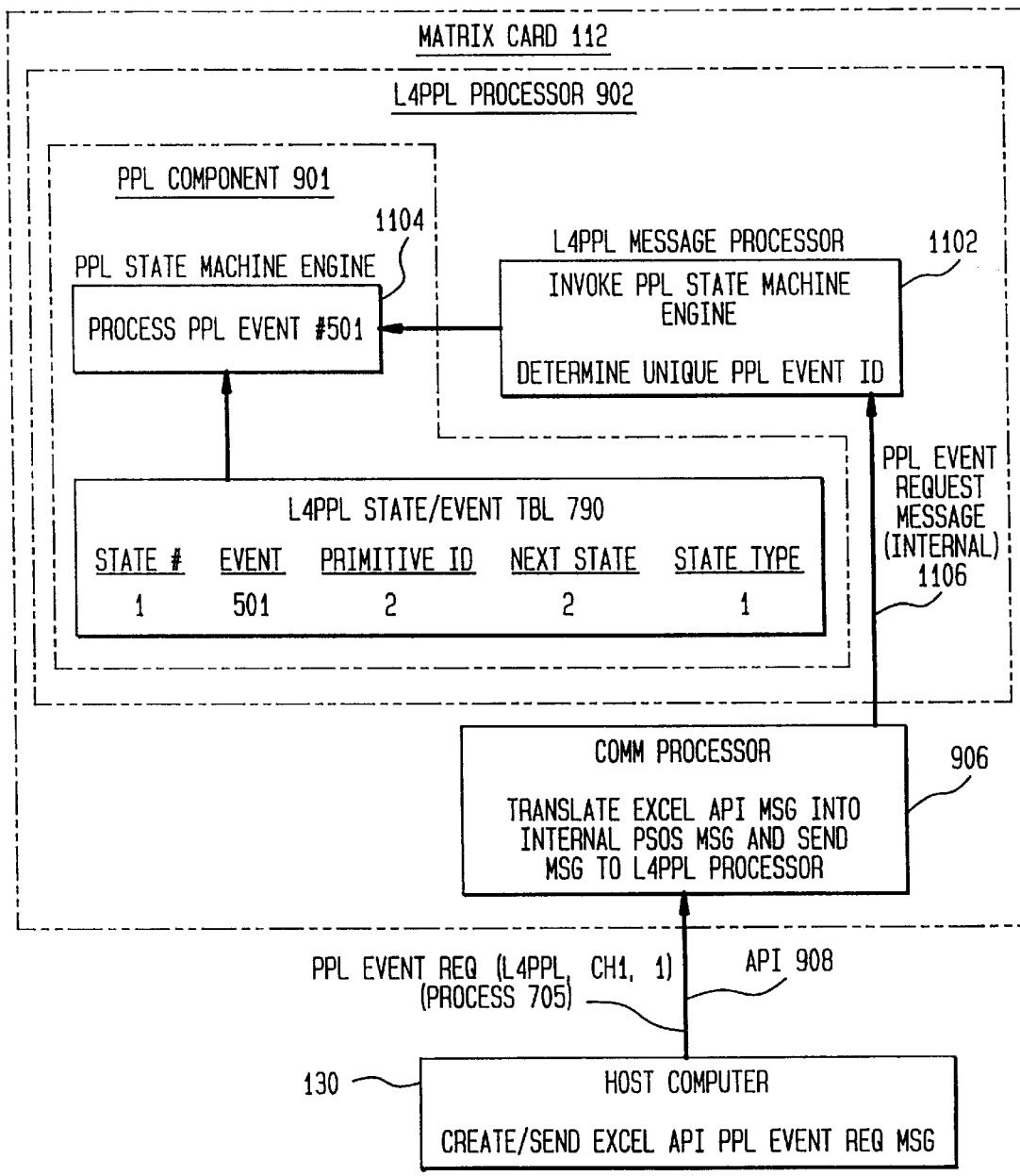
FIG. 11 is a functional block diagram illustrating an exemplary process flow to create a PPL Event Request message.

Referring to FIGS. 9–11, a Layer 4 PPL component 901 is executed as part of a Layer 4 PPL processor 902. As noted above, there may be multiple instantiations of a PPL component operating simultaneously, each of which has an associated state machine and tables. All instantiations of a the Layer 4 PPL component 901 are executed on a PPL state machine engine 1104. Layer 4 PPL processor 902 also includes a Layer 4 PPL message processor 1102 for receiving and processing internal PPL Event Request messages 1106. Each PPL processor such as Layer 4 PPL processor 902 may contain any number of PPL components. In the exemplary embodiment shown in FIGS. 9 and 11, the Layer 4 PPL processor 902 contains a single Layer 4 PPL component 901.

FIG. 9 illustrates the process flow related to the invocation and execution of an atomic function to create a PPL Event Indication message. For exemplary purposes, FIG. 9 illustrates the functions performed in relation to the processing of atomic function af35 (704) of primitive #1 (750) to create PPL Event Indication message 701. Atomic function af35 (704) is part of the Layer 4 PPL component 901.

Layer 4 PPL processor 902 resides on CPU/matrix card 112 in the illustrative embodiment discussed above, and invokes atomic functions in accordance with the state/event and primitive tables to perform various functions, including the functions discussed above with reference to the Call Management Layer 4 in FIG. 2. As noted, Call Management Layer 4 is responsible for performing centralized call processing functions and providing a common interface to Application Layer 5.

In the preferred embodiment of the present invention, the functions performed by the Layer 4 PPL processor 902 are implemented in a publicly available, proprietary operating system referred to as PSOS, available from Integrated Systems, Inc., Santa Clara, Calif., USA. However, as will become apparent to one skilled in the relevant art, the present invention may be implemented in any commonly known software program and in any software language now or later developed.

Generally, the Layer 4 PPL processor 902 invokes atomic functions that generate internal representations of the PPL Event Indication message. The internal message is passed to a communications processor 906, also residing on the CPU/matrix card 112, for translation into a PPL Event Indication message of the universal API of the present invention.

When Layer 4 PPL processor 902 executes a primitive of a PPL component state machine, it invokes each of the atomic functions associated with that primitive, as indicated by the primitive table 780 discussed above. In the example discussed above with reference to FIGS. 7A and 7B, atomic function af35 (704) is the only atomic function included in primitive #1. As noted, atomic function af35 is a PPL Send Event Indication atomic function used whenever a PPL Event Indication is to be sent to the host, each occurrence of the atomic function having a different PPL event ID to indicate the occurrence of a different event.

A number of functions, each of which is described below, are performed by the Layer 4 PPL atomic function af35 (704) to create the PPL Event Indication message 701 for transmission to a Layer 5 host application. Referring to FIG. 10, layer 4 PPL processor 902 allocates a message buffer 1050 to "attach" to the internal representation of the PPL Event Indication message 904 generated by the atomic function af35 (704). The message buffer is used by the PSOS operating system to store the necessary information for creation of the PPL Event Indication message 701. A pointer to that message buffer is obtained through the PSOS operating system when the buffer is allocated.

Once the message buffer is allocated, destination and source ID fields 1052, 1054 are loaded. The contents of these two fields is determined by the relative location of the transmitting and receiving elements. In addition to enabling a PPL component to communicate with Layer 5 applications residing on the host, the universal API of the present invention may be implemented to manage communications between any two instantiations of any PPL components residing in the same or different PPL processors.

When the universal API is utilized to achieve communications between PPL components that are located in, or "owned", by the same PPL processor, then the source and destination ID fields are loaded with the PPL component ID. Otherwise, the source and destination ID fields are loaded with the processor virtual ID, and the message type field 1058 is used by the destination PPL component or application to direct the message to the appropriate instantiation of the desired PPL component residing in the destination PPL processor. The message type field 1058 contains a unique message type identifier that is associated with a specific PPL component.

The Layer 4 PPL processor 902 also loads a PPL event ID into the associated field 1056 of the message buffer, the event ID identified in the PPL primitive table 780 provided to atomic function af35 (704). In the example illustrated in FIG. 7, atomic function af35 (704) indicates the detection of an incoming call during idle state S0, and is assigned a PPL event ID of 1.

An ICB count field 1062 is loaded with the number of trailing ICB data fields 1064, if any.

The Layer 4 PPL processor 902 transfers the data buffer 1050 to the PPL Event Indication message 904. This is accomplished by invoking a function that attaches the allocated buffer 1050 to the PPL Event Indication message 904 by providing the communications processor 906 with a pointer to the data buffer 1050. The communications processor 906 reformats the API messages of the present invention from the internal representation usable by the PPL processor 902 to the format shown in FIG. 5 for transmission to the host application. Communications processor 906 performs well known translating operations typical of message handling communications processors, and is considered to be well known in the art. Communications processor 906 then transmits the PPL Event Indication message 701 to an applications program located in host computer 130 via the API interface 908.

The scheme discussed above with respect to the Layer 4 PPL processor 902 is shown below by the following pseudo-code. It is envisioned that this pseudo-code can be used to generate source code for the present invention in any suitable language, such as C, C++ or PASCAL:

```
1.    allocate psos msg data buffer (ppl_data_buff);
2.    psos_msg.ppl_component=L4PPL;
3.    psos_msg.event_id=event_id;
4.    psos_msg.destination = HOST;
```

-continued

```
5.      psos_msg.source = L4PPL;
6.      psos_msg.timeslot_addr = CHANNEL 1;
7.      l4ppl_send_msg (psos_msg, comm_queue);
```

FIG. 11 illustrates the process flow related to the receipt and processing of a PPL Event Request message. For exemplary purposes, FIG. 11 illustrates the functions related to the processing of PPL Event Request message 705 received at wait state S1 (706), invoking primitive 2 atomic functions as shown in primitive table 780.

The communications processor 1006 performs the inverse operation of that performed above with respect to the PPL Event Indication message. That is, the communications processor 1006 receives the API version of the PPL Event Request message 705 over API 1008 and translates it into an internal PSOS PPL Event Request message 1106. Communications processor 1006 transmits the PPL Event Request message 1106 to the Layer 4 PPL processor 1002. A Layer 4 PPL message processor 1102 receives and processes the internal PPL Event Request message 1106 and generates a distinct Layer 4 PPL event for the Layer 4 PPL state machine engine 1104.

The Layer 4 PPL message processor 1102 converts the PPL event ID 522 of message 705 into a Layer 4 unique PPL event ID for the Layer 4 PPL state machine 1104 by adding a layer 5 event request base value of 500 to the PPL event ID. Thus, in the exemplary embodiment, the Layer 4 PPL message processor 1102 adds a base value of 500 to the PPL Event Request message PPL event ID of 1 to result in a Layer 4 unique PPL event ID of 501.

Once the PPL Event Request message is mapped to a Layer 4 unique PPL event ID, a pointer is derived to the selected channel's PPL data based upon the address element value in the message that contained a logical span and channel ID. In other words, the Layer 4 PPL message processor 1102 converts the logical address into a physical address, i.e., a physical time slot in switch 110. Then the PPL state machine engine is invoked, typically as a function call, with the channel pointer for the PPL component instantiation data block and a pointer to the data block associated with the PPL Event Request message 1106 that was received from the communications processor 1006.

The Layer 4 PPL component state machine engine 1104 processes the Layer 4 unique PPL event ID, searching the state/event table 790 for that PPL Event ID for the present state. If a matching event is found, the state machine engine 1104 invokes the identified primitive in the state/event table, retrieving from primitive table 780 the atomic functions associated with the primitive ID.

Thus, in the illustrative embodiment, the Layer 4 PPL component state machine engine 1104 processes PPL event 501, locating the PPL Event ID of 501 for the present state S1 (706) in the state/event table 790 and invoking the atomic functions associated with primitive #2. The PPL state machine engine 1104 enters the state indicated in the Layer 4 PPL state/event table 790 after processing all the atomic functions associated with primitive 2.

Pseudo-code for Layer 4 PPL message processor 1102 as contemplated by embodiments of the present invention is disclosed below:

```
1.      ppl_event=psos_msg.ppl_data_buff→ppl_event +
        ppl_L5_event_req_base
2.      ppl_chan_ptr = ppl_data [psos_msg.hdr.timeslot_addr]
3.      ppl_stmch(ppl_chan_ptr, ppl_event, psos.msg)
```

It should be understood that embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention. In particular, the pseudo-code discussed above can be especially useful for creating the software embodiments.

While the invention has been particularly shown and described with reference to preferred embodiments thereof, it will be understood by those skilled in the art that various changes in form and details may be made therein without departing from the spirit and scope of the invention. Furthermore, the terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A universal applications program interface (API) for transferring standardized user-programmable interactive call processing communication messages having, a generic message format among PPL components in functional layers of a telecommunications system including a telecommunications switch and a host device coupled to the switch, comprising:
   (A) one or more instantiations of one or more PPL component state machines each of which represents a call processing protocol;
   (B) a first programmable message having user-programmable functionality for transferring all call control processing commands and data from said host to said functional layers of said telecommunications switch which first programmable message is sent on an associated PPL component with optional control block data, and said first programmable message comprising:
   i) a frame byte having a constant value for identifying it as the first byte of a frame;
   ii) a message length field containing the length of said first programmable message;
   iii) a message type field containing a constant value identifying the particular message as a first programmable message;
   iv) a sequence number field specifying a numeric identifier assigned to each first programmable message that is generated by said host;
   v) a PPL component ID for identifying which PPL component implemented in said switch is referenced by a particular first programmable message;
   vi) at least one address element field for identifying which instantiations of said PPL component state machine being referenced;
   vii) an address count field for specifying the total number of address element fields included in a first programmable message;
   viii) a PPL event ID field for providing said switch with a user-defined PPL event ID that the switch recognizes as being associated with a particular request;

ix) one or more information control blocks for containing the data fields in said first programmable message; and x) an information control block count field for specifying the total number of information control blocks in said first programmable message; a (C) a second programmable message for transferring all call control processing status and data within said functional layers of said telecommunications switch or from said functional layers of said telecommunications switch to said host.

2. The API as in claim 1, wherein said address element field in said first programmable message further comprises:

an address element type field for referencing hierarchical components of said switch that may contain or be associated with the desired state machine instantiation;

an address element length field for specifying the length of said address element length field; and an address information subfield for providing specific addresses for each of the hierarchical components indicated in said address element type field.

3. The API as in claim 2, wherein each of said one or more information control blocks in said first programmable message further comprises:

an information control block type field for defining the type of said information control block structure;

an information control block subtype field for further defining the type of said information control block structure;

an information control block length field specifying the length of said information control block structure; and one or more information control block data fields for storing the data in said information control block.

4. The API as in claim 3, wherein each of said one or more information control block data fields in said first programmable message further comprises:

one or more data structures for storing data; and a data count field for specifying the total number of data structures in each of said one or more information control block data fields.

5. The API as in claim 4, wherein each of said one or more data structures in each of said one or more information control block data fields comprises:

a tag field for defining the type of data structure;

a length field for specifying the length of said data structure; and a value field for storing the data in each of said one or more data structures.

6. The API as in claim 5, wherein each of said one or more information control block data fields may store one or more generic data structures that are predefined by said switch.

* * * * *